United States Patent
Lickfelt et al.

(10) Patent No.: US 10,358,859 B2
(45) Date of Patent: Jul. 23, 2019

(54) SYSTEM AND METHOD FOR INHIBITING AUTOMATIC MOVEMENT OF A BARRIER

(71) Applicant: Honda Motor Co., Ltd., Tokyo (JP)

(72) Inventors: Brian K. Lickfelt, Powell, OH (US); Kentaro Yoshimura, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/791,063

(22) Filed: Oct. 23, 2017

(65) Prior Publication Data

US 2019/0048639 A1 Feb. 14, 2019

Related U.S. Application Data

(60) Provisional application No. 62/542,755, filed on Aug. 8, 2017.

(51) Int. Cl.
*G08B 23/00* (2006.01)
*E05F 15/77* (2015.01)
(Continued)

(52) U.S. Cl.
CPC .......... *E05F 15/77* (2015.01); *E04H 6/02* (2013.01); *E04H 6/42* (2013.01); *E05F 15/40* (2015.01);
(Continued)

(58) Field of Classification Search
CPC . E05F 15/40; E05F 15/77; E05F 15/73; E05F 15/668; E05F 2015/763; E05F 2015/767; E04H 6/02; E04H 6/42; G01S 17/026; G01S 17/41; G01S 17/51; H04L 12/2829; H04L 12/021; G05B 15/02; G07C 9/00007; G07C 2009/00928;
(Continued)

(56) References Cited

U.S. PATENT DOCUMENTS 5,350,986 A * 9/1994 Long .................. B60J 5/047
318/432
5,625,980 A    5/1997 Teich et al.
(Continued)

OTHER PUBLICATIONS

Office Action of U.S. Appl. No. 15/803,293 dated Mar. 22, 2018, 48 pages.
(Continued)

*Primary Examiner* — Kerri L McNally
*Assistant Examiner* — Thang D Tran
(74) *Attorney, Agent, or Firm* — Rankin, Hill & Clark LLP

(57) ABSTRACT

A system and method for inhibiting automatic movement of a barrier that includes determining a current state of the barrier when a vehicle travels through at least one first zone associated with the barrier. The system and method also include analyzing sensor data to determine if at least one: individual or object is located within a movement path of the barrier. The system and method further include inhibiting a sending of the at least one barrier control signal that is automatically sent to move the barrier once the vehicle travels through at least one second zone upon determining that the at least one: individual or object is located within the movement path of the barrier. Additionally, the system and method include presenting a user interface alert relating to inhibiting the automatic movement of the barrier.

20 Claims, 9 Drawing Sheets

(51) Int. Cl.
  *E05F 15/73* (2015.01)
  *G07C 9/00* (2006.01)
  *H04W 4/021* (2018.01)
  *G01S 19/51* (2010.01)
  *G05B 15/02* (2006.01)
  *E05F 15/40* (2015.01)
  *E04H 6/02* (2006.01)
  *E04H 6/42* (2006.01)
  *G01S 17/02* (2006.01)
  *H04L 12/28* (2006.01)
  *G01S 19/41* (2010.01)
  *E05F 15/668* (2015.01)

(52) U.S. Cl.
  CPC ............ *E05F 15/73* (2015.01); *G01S 17/026* (2013.01); *G01S 19/41* (2013.01); *G01S 19/51* (2013.01); *G05B 15/02* (2013.01); *G07C 9/00007* (2013.01); *H04L 12/2829* (2013.01); *H04W 4/021* (2013.01); *E05F 15/668* (2015.01); *E05F 2015/763* (2015.01); *E05F 2015/767* (2015.01); *E05Y 2400/45* (2013.01); *E05Y 2400/818* (2013.01); *E05Y 2800/426* (2013.01); *E05Y 2900/106* (2013.01); *E05Y 2900/40* (2013.01); *G07C 2009/00928* (2013.01)

(58) Field of Classification Search
  CPC ........... E05Y 2400/45; E05Y 2400/818; E05Y 2800/426; E05Y 2900/106; E05Y 2900/40
  USPC .................................................. 340/517, 935
  See application file for complete search history.

(56) References Cited

U.S. PATENT DOCUMENTS

| | | | |
|---|---|---|---|
| 5,793,300 A | 8/1998 | Suman et al. | |
| 5,900,806 A | 5/1999 | Issa et al. | |
| 6,091,217 A | 7/2000 | Parsadayan | |
| 6,091,330 A | 7/2000 | Swan et al. | |
| 6,271,765 B1 | 8/2001 | King et al. | |
| 6,400,956 B1 | 6/2002 | Richton | |
| 6,469,464 B1 * | 10/2002 | McCall | E05F 15/668 318/245 |
| 6,476,732 B1 | 11/2002 | Stephan | |
| 6,526,335 B1 | 2/2003 | Treyz et al. | |
| 6,563,278 B2 | 5/2003 | Roman | |
| 6,615,132 B1 | 9/2003 | Nagasaka et al. | |
| 6,711,474 B1 | 3/2004 | Treyz et al. | |
| 6,911,898 B2 | 6/2005 | Chung | |
| 6,975,203 B2 | 12/2005 | Brookbank et al. | |
| 7,039,391 B2 | 5/2006 | Rezvani et al. | |
| 7,046,119 B2 | 5/2006 | Ghabra et al. | |
| 7,068,163 B2 | 6/2006 | Sari et al. | |
| 7,071,813 B2 | 7/2006 | Fitzgibbon | |
| 7,088,265 B2 | 8/2006 | Tsui et al. | |
| 7,127,847 B2 | 10/2006 | Fitzgibbon et al. | |
| 7,170,248 B2 | 1/2007 | Tsui et al. | |
| 7,170,426 B2 | 1/2007 | Tsui et al. | |
| 7,183,933 B2 | 2/2007 | Dzurko et al. | |
| 7,205,908 B2 | 4/2007 | Tsui et al. | |
| 7,310,043 B2 | 12/2007 | Mamaloukas | |
| 7,327,107 B2 | 2/2008 | Mullet et al. | |
| 7,327,108 B2 | 2/2008 | Mullet et al. | |
| 7,332,999 B2 | 2/2008 | Fitzgibbon | |
| 7,342,368 B2 | 3/2008 | Roman | |
| 7,358,480 B2 | 4/2008 | Mullet et al. | |
| 7,545,833 B2 | 6/2009 | Chau et al. | |
| 7,498,936 B2 | 9/2009 | Maeng | |
| 7,602,283 B2 | 10/2009 | John | |
| 7,609,146 B2 | 10/2009 | Tang et al. | |
| 7,635,960 B2 | 12/2009 | Mullet et al. | |
| 7,710,284 B2 | 5/2010 | Dzurko et al. | |
| 7,733,218 B2 | 6/2010 | Drago et al. | |
| 7,881,733 B2 | 2/2011 | Staton et al. | |
| 7,911,358 B2 | 3/2011 | Bos et al. | |
| 7,973,678 B2 | 7/2011 | Petricoin, Jr. et al. | |
| 8,049,595 B2 | 11/2011 | Olson et al. | |
| 8,058,970 B2 | 11/2011 | Mullet et al. | |
| 8,068,006 B2 | 11/2011 | Martin | |
| 8,111,997 B2 | 2/2012 | Butler | |
| 8,115,616 B2 | 2/2012 | Gonzaga | |
| 8,179,229 B2 | 5/2012 | Mullet | |
| 8,244,448 B2 | 8/2012 | Newman | |
| 8,279,040 B2 * | 10/2012 | Laird | E05F 17/00 318/103 |
| 8,291,642 B2 | 10/2012 | Jankovsky | |
| 8,299,893 B2 | 10/2012 | Mullet | |
| 8,330,572 B2 | 12/2012 | Rodriguez et al. | |
| 8,400,264 B2 | 3/2013 | Mullet et al. | |
| 8,531,266 B2 | 9/2013 | Shearer et al. | |
| 8,577,392 B1 | 11/2013 | Pai et al. | |
| 8,643,467 B2 | 2/2014 | Chutorash et al. | |
| 8,648,695 B2 * | 2/2014 | Fitzgibbon | G05B 15/02 340/5.71 |
| 8,653,962 B2 | 2/2014 | Maeng | |
| 8,710,978 B2 | 4/2014 | Stählin et al. | |
| 8,878,646 B2 | 11/2014 | Chutorash et al. | |
| 8,922,356 B2 | 12/2014 | Lambert et al. | |
| 8,994,496 B2 | 3/2015 | Freese et al. | |
| 9,007,168 B2 | 4/2015 | Bos et al. | |
| 9,129,502 B2 | 9/2015 | Naim et al. | |
| 9,169,684 B2 | 10/2015 | Fan et al. | |
| 9,189,952 B2 | 11/2015 | Chutorash et al. | |
| 9,208,629 B2 | 12/2015 | Saladin et al. | |
| 9,230,378 B2 | 1/2016 | Chutorash et al. | |
| 9,264,673 B2 | 2/2016 | Chundrlik, Jr. et al. | |
| 9,326,100 B2 | 4/2016 | Guo et al. | |
| 9,412,264 B2 | 8/2016 | Geerlings et al. | |
| 9,430,939 B2 | 8/2016 | Shearer et al. | |
| 9,507,335 B2 | 11/2016 | Wilder et al. | |
| 9,509,962 B2 | 11/2016 | Chundrlik, Jr. et al. | |
| 9,539,930 B2 | 1/2017 | Geerlings | |
| 9,542,834 B2 | 1/2017 | Geerlings et al. | |
| 9,551,781 B2 | 1/2017 | Baxley et al. | |
| 9,555,814 B2 | 1/2017 | Neubecker et al. | |
| 9,556,812 B2 | 1/2017 | Ozkan | |
| 9,581,456 B2 | 2/2017 | Liao et al. | |
| 9,600,950 B2 | 3/2017 | Chutorash et al. | |
| 9,620,005 B2 | 4/2017 | Geerlings et al. | |
| 9,656,691 B2 | 5/2017 | Heimberger et al. | |
| 9,672,670 B2 | 6/2017 | Menkveld | |
| 9,879,466 B1 | 1/2018 | Yu | |
| 2002/0002443 A1 | 1/2002 | Ames et al. | |
| 2002/0170685 A1 | 11/2002 | Weik, III et al. | |
| 2003/0102836 A1 | 6/2003 | McCall | |
| 2003/0174045 A1 | 9/2003 | Zhang | |
| 2003/0197594 A1 | 10/2003 | Olson et al. | |
| 2003/0197595 A1 | 10/2003 | Olson et al. | |
| 2003/0216139 A1 | 11/2003 | Olson et al. | |
| 2005/0140321 A1 | 6/2005 | Wojciak, Jr. | |
| 2005/0206497 A1 * | 9/2005 | Tsui | G07C 9/00182 340/5.71 |
| 2005/0212681 A1 | 9/2005 | Dzurko et al. | |
| 2006/0071155 A1 * | 4/2006 | Chen | E05F 15/43 250/221 |
| 2006/0077035 A1 * | 4/2006 | Mamaloukas | G07C 9/00309 340/5.61 |
| 2006/0157206 A1 | 7/2006 | Weik, III et al. | |
| 2006/0158344 A1 | 7/2006 | Bambini et al. | |
| 2006/0220834 A1 | 10/2006 | Maeng | |
| 2007/0046232 A1 * | 3/2007 | Mullet | G07C 9/00309 318/280 |
| 2007/0085067 A1 | 4/2007 | Lewis | |
| 2007/0188120 A1 * | 8/2007 | Mullet | G07C 9/00182 318/280 |
| 2008/0061926 A1 | 3/2008 | Strait | |
| 2008/0224819 A1 | 9/2008 | Callentine | |
| 2009/0189779 A1 | 7/2009 | Gao | |
| 2009/0269635 A1 | 10/2009 | Muramatsu | |

(56) References Cited

U.S. PATENT DOCUMENTS

| | | | |
|---|---|---|---|
| 2010/0085145 A1* | 4/2010 | Laird | E05F 17/00 340/5.7 |
| 2010/0127882 A1 | 5/2010 | Sitarski | |
| 2010/0265034 A1 | 10/2010 | Cap et al. | |
| 2011/0032073 A1* | 2/2011 | Mullet | G07C 9/00182 340/5.7 |
| 2011/0032115 A1 | 2/2011 | Kwiecinski et al. | |
| 2011/0193700 A1 | 8/2011 | Fitzgibbon et al. | |
| 2012/0255231 A1* | 10/2012 | Jenkins | H04W 52/0229 49/358 |
| 2012/0265874 A1 | 10/2012 | Hoh et al. | |
| 2013/0033359 A1 | 2/2013 | Ji et al. | |
| 2013/0042530 A1* | 2/2013 | Leivenzon | G01V 8/12 49/26 |
| 2013/0086841 A1* | 4/2013 | Luper | E05F 15/43 49/28 |
| 2013/0117078 A1 | 5/2013 | Weik, III et al. | |
| 2013/0147600 A1 | 6/2013 | Murray | |
| 2013/0147616 A1* | 6/2013 | Lambert | G07C 5/008 340/426.1 |
| 2014/0118111 A1* | 5/2014 | Saladin | E05F 15/77 340/7.51 |
| 2014/0125499 A1* | 5/2014 | Cate | E05F 15/60 340/933 |
| 2014/0167961 A1 | 6/2014 | Finlow-Bates | |
| 2014/0266593 A1 | 9/2014 | Nye et al. | |
| 2014/0305599 A1* | 10/2014 | Pimenov | E06B 9/68 160/7 |
| 2014/0320263 A1* | 10/2014 | Fan | E05F 15/77 340/5.71 |
| 2015/0002262 A1 | 1/2015 | Geerlings et al. | |
| 2015/0084750 A1 | 3/2015 | Fitzgibbon | |
| 2015/0084779 A1* | 3/2015 | Saladin | G07C 9/00896 340/686.6 |
| 2015/0137941 A1 | 5/2015 | Bauer et al. | |
| 2015/0148983 A1 | 5/2015 | Fitzgibbon | |
| 2015/0235495 A1 | 8/2015 | Hall et al. | |
| 2015/0266356 A1 | 9/2015 | Fischer et al. | |
| 2015/0302672 A1 | 10/2015 | Kalsi et al. | |
| 2015/0302735 A1 | 10/2015 | Geerlings et al. | |
| 2015/0302736 A1 | 10/2015 | Geerlings et al. | |
| 2015/0302737 A1 | 10/2015 | Geerlings et al. | |
| 2015/0348344 A1 | 12/2015 | Rettig et al. | |
| 2016/0018798 A1 | 1/2016 | Jiang et al. | |
| 2016/0053699 A1* | 2/2016 | Ozkan | F02D 41/042 701/112 |
| 2016/0055742 A1 | 2/2016 | Wang et al. | |
| 2016/0101736 A1 | 4/2016 | Geedings et al. | |
| 2016/0104364 A1* | 4/2016 | Brooks | B65G 69/00 340/686.1 |
| 2016/0117879 A1 | 4/2016 | Chutorash et al. | |
| 2016/0130853 A1 | 5/2016 | Tehranchi | |
| 2016/0148451 A1 | 5/2016 | Menkveld | |
| 2016/0300415 A1 | 10/2016 | Deneen et al. | |
| 2016/0312517 A1 | 10/2016 | Elie et al. | |
| 2016/0314362 A1 | 10/2016 | Elie et al. | |
| 2016/0321914 A1 | 11/2016 | Geerlings et al. | |
| 2016/0343233 A1 | 11/2016 | Wassef et al. | |
| 2016/0375898 A1 | 12/2016 | Breuel et al. | |
| 2017/0030737 A1 | 2/2017 | Elie et al. | |
| 2017/0034485 A1 | 2/2017 | Scalisi | |
| 2017/0106874 A1 | 4/2017 | Neubecker et al. | |
| 2017/0108873 A1* | 4/2017 | Tanaka | B60W 30/18009 |
| 2017/0114585 A1 | 4/2017 | Ozkan | |
| 2017/0138111 A1 | 5/2017 | Lietz et al. | |
| 2017/0140646 A1 | 5/2017 | Lu et al. | |
| 2017/0147887 A1 | 5/2017 | Be et al. | |
| 2017/0154482 A1* | 6/2017 | Osborne | G07C 9/00309 |
| 2017/0175433 A1* | 6/2017 | Kang | E05F 15/77 |
| 2018/0030764 A1* | 2/2018 | Shaw | E05F 15/42 |
| 2018/0194344 A1* | 7/2018 | Wang | B60W 30/06 |
| 2018/0216389 A1* | 8/2018 | Tsui | E05F 15/40 |
| 2018/0247475 A1* | 8/2018 | Archbold | G07C 9/00309 |

OTHER PUBLICATIONS

Office Action of U.S. Appl. No. 15/713,782 dated Sep. 7, 2018, 47 pages.

Office Action of U.S. Appl. No. 15/803,293 dated Jul. 9, 2019, 41 pages.

Notice of Allowance of U.S. Appl. No. 15/810,609 dated Jul. 11, 2018, 30 pages.

Office Action of U.S. Appl. No. 15/803,293 dated Nov. 29, 2018, 52 pages.

Office Action of U.S. Appl. No. 15/861,027 dated Dec. 14, 2018, 40 pages.

Office Action of U.S. Appl. No. 15/696,211 dated Jan. 2, 2019, 48 pages.

Office Action of U.S. Appl. No. 15/884,730 dated Jan. 10, 2019, 35 pages.

Office Action of U.S. Appl. No. 15/803,293 dated Mar. 29, 2019, 57 pages.

Office Action of U.S. Appl. No. 15/861,027 dated May 1, 2019, 14 pages.

* cited by examiner

US 10,358,859 B2

SYSTEM AND METHOD FOR INHIBITING AUTOMATIC MOVEMENT OF A BARRIER

This application claims priority to U.S. Provisional Application Ser. No. 62/542,755 filed on Aug. 8, 2017, which is expressly incorporated herein by reference.

BACKGROUND

In many cases, movable barriers such as entrance gates and garage doors may be mechanically operated to open or close as a vehicle is arriving towards a barrier or departing away from the barrier. In many cases, the vehicle may be located in an area capable of communicating via radio frequency communication with a controller of the barrier in order to actuate the opening or closing of the barrier without the driver of the vehicle being able to view a movement path (e.g., opening path or closing path) of the barrier to determine if an individual or object is located within the movement path.

In some cases, when the vehicle is arriving towards the barrier, the opening of the barrier such an entrance gate may be actuated before a driver has an opportunity to observe if an individual or object is obstructing the opening path of the gate. Similarly, when the vehicle is departing away from the barrier, the closing of the barrier such as garage door may be actuated even if an individual or object may obstruct the closing path of the garage door.

BRIEF DESCRIPTION

According to one aspect, a computer-implemented method for inhibiting automatic movement of a barrier that includes determining a current state of the barrier when a vehicle travels through at least one first zone associated with the barrier. The method also includes analyzing sensor data to determine if at least one: individual or object is located within a movement path of the barrier. At least one barrier control signal is sent to automatically control movement to open or close the barrier based on the current state of the barrier. The method additionally includes inhibiting a sending of the at least one barrier control signal that is automatically sent to move the barrier once the vehicle travels through at least one second zone upon determining that at least one: individual or object is located within the movement path of the barrier. The method further includes presenting a user interface alert relating to inhibiting the automatic movement of the barrier.

According to another aspect, a system for inhibiting automatic movement of a barrier that includes a memory storing instructions when executed by a processor cause the processor to determine a current state of the barrier when a vehicle travels through at least one first zone associated with the barrier. The instructions also cause the processor to analyze sensor data to determine if at least one: individual or object is located within a movement path of the barrier. At least one barrier control signal is sent to automatically control movement to open or close the barrier based on the current state of the barrier. The instructions additionally cause the processor to inhibit a sending of the at least one barrier control signal that is automatically sent to move the barrier once the vehicle travels through at least one second zone upon determining that at least one: individual or object is located within the movement path of the barrier. The instructions further cause the processor to present a user interface alert relating to inhibiting the automatic movement of the barrier.

According to still another aspect, a computer readable storage medium storing instructions that when executed by a computer, which includes at least a processor, causes the computer to perform a method that includes determining a current state of a barrier when a vehicle travels through at least one first zone associated with the barrier. The instructions also include analyzing sensor data to determine if at least one: individual or object is located within a movement path of the barrier. At least one barrier control signal is sent to automatically control movement to open or close the barrier based on the current state of the barrier. The instructions additionally include inhibiting a sending of the at least one barrier control signal that is automatically sent to move the barrier once the vehicle travels through at least one second zone upon determining that at least one: individual or object is located within the movement path of the barrier. The instructions further include presenting a user interface alert relating to inhibiting the automatic movement of the barrier.

DETAILED DESCRIPTION

Figure 1:
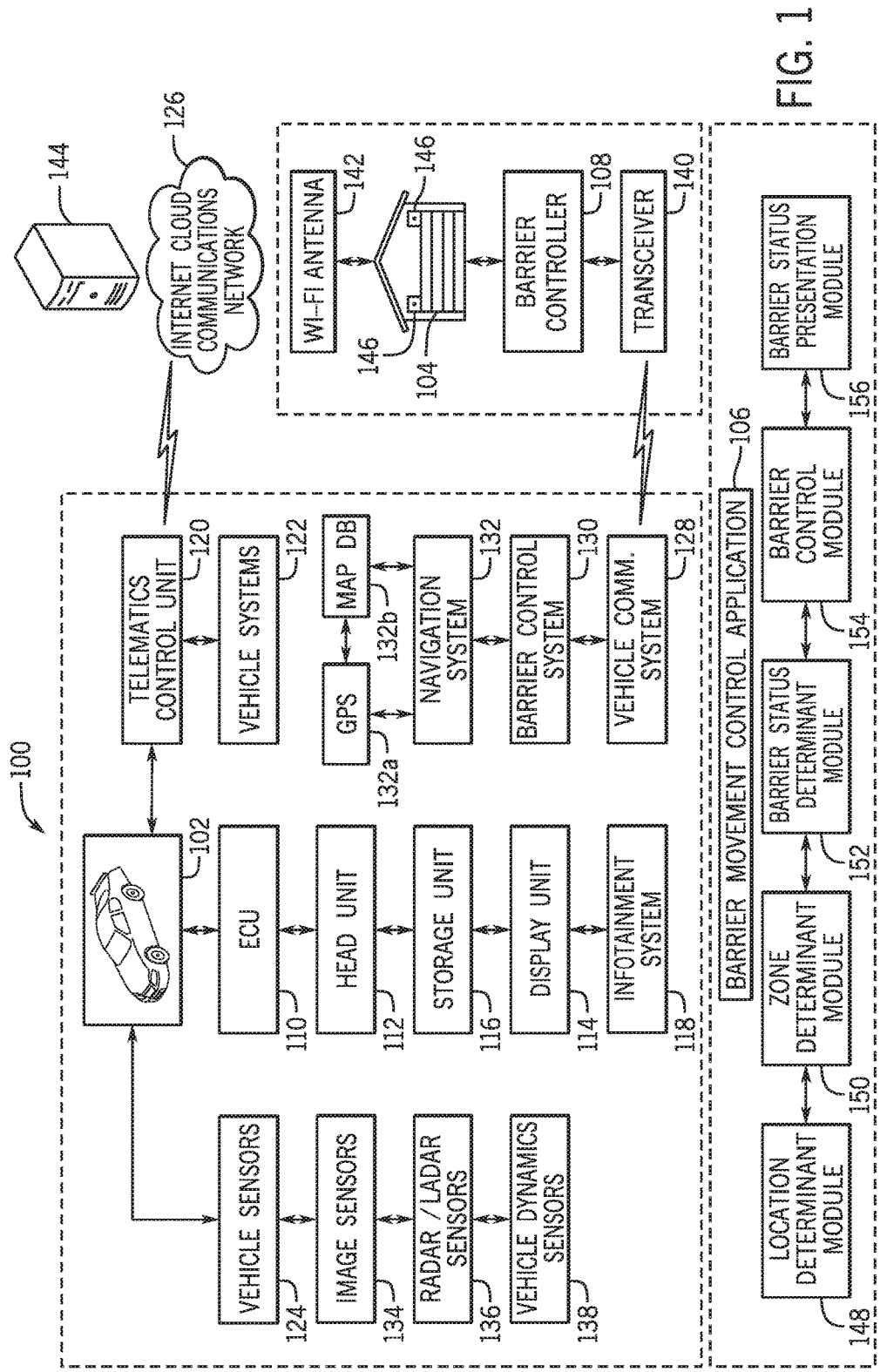
FIG. 1 is a schematic view of an operating environment for implementing systems and methods within a vehicle for inhibiting automatic movement of a movable barrier according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), a Bluetooth® communication system, a radio frequency communication system (e.g., LF radio frequency), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers. In some embodiments, a "portable device" could refer to a remote device that includes a processor for computing and/or a communication interface for receiving and transmitting data remotely.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an operating environment 100 for implementing systems and methods within a vehicle 102 for inhibiting automatic movement of a movable barrier (barrier) 104 according to an exemplary embodiment. The components of the environment 100, as well as the components of other systems, hardware architectures, and software architectures discussed herein, can be combined, omitted, or organized into different architectures for various embodiments.

Generally, the environment includes a barrier movement control application (barrier control application) 106 that is executed to automatically control the movement of the barrier 104 that may include, but may not be limited to a garage door, a gate (e.g., one or more entry or exit gate doorways), a door (e.g., a residential door), etc., based on a current state (e.g., opened state or closed state) of the barrier 104 from a vehicle 102 based on a current location of the vehicle 102, traveling direction of the vehicle 102 and/or current opened or closed state of the barrier 104. More specifically, the barrier control application 106 may determine the (traveling or parking) location of the vehicle 102, the vehicle 102 is either arriving towards a location at which the barrier 104 is located (arriving towards the barrier 104) or departing away from the location at which the barrier 104 is located (departing away from the barrier 104), and the like.

As discussed in much detail below, the barrier control application 106 may be used to determine one or more zones associated with the barrier 104 that may be applied by the application 106 to send one or more types of signals to a barrier controller 108 based on one or more factors. The one or more types of signals may be used to determine a current state of the barrier 104, to send a command to traverse the barrier 104 to the opened state (e.g., to fully open the barrier 104), traverse the barrier 104 to the closed state (e.g., to fully close the barrier 104). As discussed below, the barrier control application 106 may operate to inhibit the automatic sending of the one or more types of signals to traverse the barrier 104 to the opened or closed state based on the detection of one or more individuals or objects that are located within a movement path of the barrier 104 (e.g., opening path or closing path of the barrier 104).

More particularly, the barrier control application 106 may operate to ensure that the barrier 104 such as an entrance/exit gate or garage door is not automatically moved to open or close the barrier 104 to traverse the barrier 104 when the individual(s) or object(s) is detected within the space that is occupied by the barrier 104 as it is opened or closed otherwise described as movement path of the barrier 104. For example, (as illustrated in FIG. 4B), the application 106 may ensure that automatic opening of an entrance gate that may occur upon the arrival of the vehicle 102 towards the entrance gate is inhibited when an object (e.g., other vehicle) is detected to be located within the space that is occupied by the barrier 104 as it is opened. Additionally, the barrier control application 106 may operate to ensure that the barrier 104 such as a garage door is not automatically closed upon the departure of the vehicle 102 from the barrier 104 when an individual or object is detected within the movement path of the barrier 104. For example, (as illustrated in FIG. 5B) the application 106 may ensure that automatic closure of the garage door that may occur when the vehicle 102 departs from the barrier 104 is inhibited when an object is detected to be located within the space that is occupied by the barrier 104 as it's closed in a downward direction.

As discussed in more detail below, upon detecting an individual or object within the movement path and inhibiting the automatic movement of the barrier 104, the barrier control application 106 may present a barrier movement inhibition alert (illustrated in FIG. 6) that may provide a user (e.g., driver of the vehicle 102) with an alert regarding the inhibiting of the automatic movement of the barrier 104 as vehicle 102 is arriving towards the barrier 104 or departing away from the barrier 104. The barrier movement inhibition alert may also present the current status of the barrier 104 as an opened state, a partially opened state, or a closed state.

More specifically, the barrier movement inhibition alert may present the current state of the barrier 104 as the opened state when the barrier 104 is stationary and within a fully opened state. Likewise, the barrier movement inhibition alert may present the current state of the barrier 104 as the closed state when the barrier 104 is stationary and within a fully closed state. Additionally, the barrier movement inhibition alert may present the real time status of the barrier 104 as the partially opened state that may indicate an opening level (e.g., percentage) of the barrier 104 as it is stationary or in movement to complete the process of being opened or closed. The barrier movement inhibition alert may also provide the user with a user input that may be utilized to manually send one or more signals to move the barrier 104 upon inhibiting the automatic sending of the signal(s).

In the illustrated embodiment of FIG. 1, the vehicle 102 may include a plurality of components that may be operably connected for computing communication via a bus (not shown) (e.g., a Controller Area Network (CAN) or a Local Interconnect Network (LIN) protocol bus), an input/output interface (I/O interface) and/or other wired and wireless technologies. The plurality of components of the vehicle 102 may generally include an electronic control unit (ECU) 110, a head unit 112, a display unit 114, a storage unit 116, and a telematics control unit (TCU) 120. Additionally, the plurality of components of the vehicle 102 may also include a plurality of vehicle systems 122 and a plurality of vehicle sensors 124 that are utilized to detect the presence of at least one individual or at least one object located within the movement path of the barrier 104.

In an exemplary embodiment, the ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources, of the environment 100. In one embodiment, the ECU 110 may execute one or more operating systems, applications, and/or interfaces that are associated with the vehicle 102 and/or the plurality of vehicle systems 122.

In one embodiment, the ECU 110 may execute the barrier control application 106 when a battery/accessory state of the vehicle 102 is enabled. Once executed, the barrier control application 106 may include components (discussed in more detail below) that may send commands to the components of the vehicle 102 and/or to components external to the vehicle 102 that include but are not limited to the barrier controller 108 operably connected to the barrier 104. In one or more embodiments, the ECU 110 may utilize sensor data provided by the plurality of vehicle sensors 124 to detect the at least one individual and/or the at least one object that is located within the movement path of the barrier 104. As discussed below, as the ECU 110 executes the barrier control application 106, one or more components of the application 106 may receive and analyze various types of sensor data provided by the plurality of vehicle sensors 124 to detect at least one individual or at least one object to further inhibit the sending of the one or more barrier control signals to move the barrier 104 to the opened state or the closed state.

In an exemplary embodiment, the plurality of vehicle sensors 124 of the vehicle 102 may include the image sensors 134, RADAR/LADAR sensors 136, and vehicle dynamics sensors 138. In one embodiment, the image sensors 134 may include a plurality of external and internal cameras that may include, but may not be limited to, an infrared camera, a digital camera, a stereo camera, a video camera (camera types not individually shown), and the like that may be mounted at one or more areas outside of and/or inside of the vehicle 102. In some embodiments, the image sensors 134 may include a plurality of cameras (not shown) that may be mounted at one or more external and interior locations of the vehicle 102 that may include, but may not be limited to, one or more bumpers (not shown), one or more external or internal light fixtures of the vehicle 102, a dashboard of the vehicle 102, a ceiling panel of the vehicle 102, side mirrors of the vehicle 102, a rear view mirror of the vehicle 102, side panels of the vehicle 102, one or more door/door handles of the vehicle 102, (all external and interior locations not individually shown) and the like.

In an exemplary embodiment, the image sensors 134 may be configured to provide a 360 degree stereoscopic view of the surrounding environment of the vehicle 102. The image sensors 134 may be configured to combine image pixels that correspond to the one or more points in a physical scene observed by the plurality of cameras. The image sensors 134 may provide image sensor data that includes a sequence of images/video that may pertain to an exterior environment of the vehicle 102. In one embodiment, the barrier control application 106 may communicate with the image sensors 134 to receive the image data as the vehicle 102 is within an image capturing distance of the barrier 104. As discussed below, the barrier control application 106 may utilize logic to analyze the one or more images of the barrier 104 to detect if the at least one individual and/or the at least one object is located within the movement path of the barrier 104.

The RADAR/LADAR sensors 136 of the plurality of vehicle sensors 124 may include, but may not be limited to, a millimeter wave radar, a laser detection and range sensor, an infrared sensor, a thermal sensor, and the like. Various alternate or additional hardware devices will be apparent for inclusion as the RADAR/LADAR sensors 136. The RADAR/LADAR sensors 136 may be disposed at one or more areas of the vehicle 102 that may include a front bumper, door panels, vehicle mirrors, a rear bumper, a roof, a floorboard, (areas of the vehicle 102 not individually shown) and the like. In one embodiment, the RADAR/LADAR sensors 136 may provide the barrier control application 106 with sensor wave data pertaining to sensing at least one obstacle that may exist within the movement path of the barrier 104. In one embodiment, the barrier control application 106 may communicate with the RADAR/LADAR sensors 136 to receive the sensor wave data that pertains to the movement path of the barrier 104 as it is moved to the opened state and/or the closed state. As discussed below, the barrier control application 106 may utilize logic to analyze the sensor wave data pertaining to the space to detect if the at least one individual and/or the at least one object is located within the movement path of the barrier 104.

In one or more embodiments, the vehicle dynamics sensors 138 may communicate with one or more components of the vehicle 102 that may include the ECU 110, an engine (not shown), a transmission (not shown), brakes (not shown), the plurality of vehicle systems 122, and the like to determine vehicle dynamics information. In some embodiments, the vehicle dynamics information may be evaluated by the barrier control application 106 to evaluate vehicle engine operation, vehicle speed, vehicle braking, vehicle steering, engine RPM, etc.

Referring to the head unit 112 of the vehicle 102, the head unit 112 may include internal processing memory, an interface circuit, and bus lines (components of the head unit not shown) for transferring data, sending commands, and communicating with the components of the vehicle 102 directly and/or through the ECU 110. In one or more embodiments, the ECU 110 may execute one or more operating systems, applications, and/or interfaces that are associated to the vehicle 102, the plurality of vehicle systems 122.

In one embodiment, the head unit 112 may be connected to an infotainment system 118. The infotainment system 118 may act as an information hub of the vehicle 102 that presents and delivers information to the user (e.g., audio, video, HVAC, barrier controls, etc.), In one embodiment, the infotainment system 118 may be operably connected to a barrier control system 130 of the vehicle 102 to send and receive data signals that may be utilized to remotely control the barrier 104. The infotainment system 118 may also be utilized to provide the barrier status user interface to the user through a display unit 114 operably connected to the infotainment system 118.

The display unit 114 may be disposed within a center stack area of the vehicle 102. Based on the operation of the infotainment system 118, the display unit 114 may display one or more vehicle human machine interfaces (vehicle HMI) to provide the driver of the vehicle 102 with various types of information and/or to receive one or more inputs from the driver of the vehicle 102. More specifically, the vehicle HMI may pertain to one or more operating systems, vehicle system interfaces, and application interfaces, including interfaces pertaining to the barrier control application 106. For example, the vehicle HMI may present one or more user interfaces of the barrier control application 106 including a barrier configuration user interface (not shown) and the barrier movement inhibition alert. In one or more embodiments, the infotainment system 118 may communicate with one or more additional display units (not shown) within the vehicle 102 that may include, but may not be limited to, a meter display and a head up display that may additionally or alternatively present the vehicle HMI.

In one embodiment, the head unit 112 may be operably connected to one or more notification devices (not shown) within the vehicle 102. More particularly, the head unit 112 may communicate with one or more haptic devices (not shown) (e.g., haptic steering wheel, haptic seats, haptic gear shifter) audio devices (not shown) (e.g., audio system, speakers), etc. that may also be used to provide the barrier movement inhibition alert relating to inhibiting the automatic movement of the barrier 104 based on the detection of the at least one individual or object. In other words, the head unit 112 may provide such notifications independent of the operation of the infotainment system 118.

In an exemplary embodiment, the vehicle 102 may additionally include a storage unit 116. The storage unit 116 may store one or more operating systems, applications, associated operating system data, application data, vehicle system and subsystem user interface data, and the like that are executed by the ECU 110, the head unit 112, and the plurality of vehicle systems 122. The storage unit 116 may include one or more barrier profiles that are respectively associated to one or more barriers based on user inputs. As discussed in more detail below, the barrier profile(s) may be created, populated and/or updated by the barrier control application 106.

In one embodiment, a respective barrier profile may include details that are associated with the barrier 104 as identified by the user and/or determined based on vehicle sensors 124. The details may include a barrier type assigned to the barrier 104 (e.g., entrance gate, exit gate, garage door), a name assigned to the barrier 104 by the user (e.g., primary garage door, main gate), a geo-location associated with the barrier 104 (e.g., GPS, DGPS coordinates of the location of the barrier 104), and a plurality of global positioning coordinates associated with respective boundaries of one or more zones associated with the barrier 104 that are utilized by the application 106. The barrier profiles may additionally include geo-locations associated with one or more sensing locations that are determined based on the capability of the image sensors 134 to capture images of a full expanse of the movement path of barrier 104 and/or the capability of the RADAR/LADAR sensors to sense obstacles that may be located within the full expanse of the movement path of the barrier 104. In some embodiments, the one or more sensing locations may be evaluated and updated within the barrier profiles each time the vehicle 102 arrives towards the barrier 104 or departs away from the barrier 104. As discussed in more detail below, the barrier profile(s) may be created, populated, updated, and/or evaluated to retrieve data based on the execution of the barrier control application 106.

In one embodiment, the TCU 120 of the vehicle 102 may be utilized as an external interface for mobile communication between the vehicle 102 and an internet cloud communication network (internet cloud) 126 to send and retrieve data stored on one or more external devices. In one embodiment, the one or more external devices may include an external server infrastructure 144 that is accessible to provide data to the TCU 120.

In an exemplary embodiment, the TCU 120 may be configured to connect to a GSM, GPRS, Wi-Fi, WiMax, or LTE wireless connection to send and receive one or more data files through the internet cloud 126 to/from the external server infrastructure 144. The TCU 120 may also include a microcontroller (not shown) that controls the processes of the TCU 120 and a storage (not shown) that may include various types of memory to temporarily store data that are provided to/from the components of the vehicle 102.

In one embodiment, the external server infrastructure 144 may include a plurality of interconnected servers that support and maintain data that can be sent to the TCU 120 and may be further utilized by one or more components of the vehicle 102. The external server infrastructure 144 may include but is not limited to web servers, data servers, database servers, domain controllers, backup servers, and the like. In an exemplary embodiment, the external server infrastructure 144 may include a barrier controller data repository (not shown) that includes the current status of the barrier 104 that may be used by the application 106. In one embodiment, upon controlling the movement of the barrier 104 and changing the status of the barrier 104 (e.g., from the opened state to the closed state), the barrier controller 108 may access the internet cloud 126 (e.g., through a Wi-Fi connection) to update and store the (updated) current status of the barrier 104.

In one or more embodiments, the barrier control application 106 may utilize the TCU 120 to communicate with the internet cloud 126 to access the external server infrastructure 144 to communicate the barrier movement inhibition alert to the external server infrastructure 144. In one embodiment, one or more portable devices (not shown) may be utilized to present the barrier status user interface to present the user with the barrier movement inhibition alert to alert the user that the barrier 104 is inhibited from being automatically opened and/or closed based on the detection of the at least one individual and/or at least one object.

In some embodiments, the barrier 104 may include barrier image sensors 146 that may be disposed near the barrier 104 to capture images of the moving path of the barrier 104. The barrier image sensors may include one or more cameras, that may include, but are not limited to, infrared cameras, digital cameras, stereo cameras, video cameras that are directed towards the movement path of the barrier 104 to capture one or more images of the moving path of the barrier 104. In some configurations, the barrier image data provided by the barrier image sensors 146 may be uploaded directly to the external server infrastructure 144 to be accessed by the barrier control application 106 via the TCU 120 of the vehicle 102.

With continued reference to the vehicle 102, in addition to the infotainment system 118, the plurality of vehicle systems 122 may include, but may not be limited to, a vehicle communication system 128, the barrier control system 130, and a navigation system 132. In one embodiment, the vehicle communication system 128 may include one or more transceivers that are capable of providing wireless computer communications utilizing various protocols to be utilized to send/receive electronic signals internally to components and systems within the vehicle 102 and to external devices including a transceiver 140 operably connected to a barrier controller 108 associated with the barrier 104.

The vehicle communication system 128 may be capable of providing wired or wireless computer communications utilizing various protocols to send/receive non-transitory signals internally to the plurality of components of the vehicle 102 and/or externally to external devices. Generally, these protocols include a wireless system (e.g., IEEE 802.11 (WiFi), IEEE 802.15.1 (Bluetooth)), a near field communication system (NFC) (e.g., ISO 13157), a local area network (LAN), and/or a point-to-point system. More particularly, the vehicle communication system 128 may be utilized by the barrier control application 106 to send (i.e., transmit) one or more radio frequency (RF) signals in one or more frequencies and/or radio bands to communicate commands and data to the barrier controller 108 through the transceiver 140. In one embodiment, the vehicle communication system 128 may communicate the one or more command signals that include but are not limited to, at least one barrier status request signal and possibly at least one barrier control signal to the transceiver 140 when the movement path of the barrier 104 is determined to be clear (i.e., individual(s) and/or object(s) are not determined to be within the movement path) based on the execution of the application 106.

In particular, the barrier control application 106 may utilize the vehicle communication system 128 to send the one or more status request signals to be evaluated by the barrier controller 108. Upon evaluating the barrier status request signal(s), barrier controller 108 may determine the current state of the barrier 104 as the opened state, the partially opened state, or the closed state and may communicate the current state in the form of one or more barrier response signals. The vehicle communication system 128 may be utilized to receive the one or more barrier response data signals sent from the transceiver 140 including, but not limited to, at least one barrier status signal that are initiated by the barrier controller 108 to be interpreted by the barrier control application 106.

As discussed below, the barrier control application 106 may further utilize data provided by the image sensors 134 and/or the RADAR/LADAR sensors 136 to detect if at least one individual and/or the at least one object is located within the movement path of the barrier 104. If the application 106 determines that the movement path of the barrier 104 is clear, the vehicle communication system 128 may send the one or more barrier control signals to remotely control movement of the barrier 104 (e.g., actuate movement of the barrier 104 to open or close) based on the determination of the current state of the barrier 104 (as determined based on the evaluation of the one or more barrier response signals provided by the barrier controller 108).

In one embodiment, the barrier control system 130 of the vehicle 102 may be utilized to provide manual or automatic commands to the vehicle communication system 128 through the infotainment system 118. In particular, the barrier control system 130 may utilize the vehicle communication system 128 to send the one or more barrier control signals to actuate movement of the barrier 104 to open or close the barrier 104 based on one or more user inputs. In one configuration, the barrier control system 130 may be included as part of a HOMELINK® trainable garage door opening device (or other embedded, integrated accessory of the vehicle 102) that is integrated within a ceiling panel (not shown) or rearview mirror (not shown) of the vehicle 102. In some configurations, the barrier control system 130 may include one or more input buttons (not shown) that may be inputted by the user to actuate movement of the barrier 104.

In an exemplary embodiment, the navigation system 132 may be connected to the head unit 112, the infotainment system 118, and the display unit 114 to provide a map user interface (not shown) to the driver of the vehicle 102. The navigation system 132 may include a global position system 132a (GPS) that may also be used to localize (i.e., determine the GPS or DGPS coordinates) the vehicle 102. The navigation system 132 may include its own processor and memory that communicate with the GPS 132a to determine and provide route guidance to the driver of the vehicle 102.

In one or more embodiments, the navigation system 132 may include and/or may connect to and access a map database 132b to present one or more details and graphics on the map user interface through the display unit 114. The map database 132b may include geographical maps of one or more locations (e.g., countries, regions, cities) in which the vehicle 102 may be driven. The map database 132b may also include locational data that pertains to the barrier 104. In one embodiment, the barrier control application 106 may utilize the navigation system 132 to localize the barrier 104 and to determine a plurality of global positioning coordinates associated with one or more areas that are located within the surrounding area of the barrier 104. The plurality of global positioning coordinates associated with the one or more areas may constitute boundaries of the one or more zones associated with the barrier 104.

With particular reference to the barrier 104, the barrier 104 may be connected to and controlled by the barrier controller 108. The barrier controller 108 may include internal processing memory, an interface circuit, and bus lines for transferring data, sending commands, and communicating with the components associated with and/or connected to the barrier 104. In one embodiment, the barrier controller 108 may be connected to a remote control (e.g., garage door remote) (not shown) and an interface device (e.g., wall inputs, numeric key pad) (not shown) that may be used by the user to provide one or more inputs to control movement of the barrier 104.

As discussed above, the barrier controller 108 may be operably connected to the transceiver 140. The barrier controller 108 may be configured to control operation of the transceiver 140 to receive the one or more command signals from the vehicle communication system 128. Additionally, the barrier controller 108 may be configured to control operation of the transceiver 140 to send (e.g., transmit) one or more response signals to the vehicle communication system 128. In particular, the barrier controller 108 may evaluate the one or more data signals received by the transceiver 140 and may instruct the transceiver 140 to send the one or more response data signals.

In an exemplary embodiment, the barrier controller 108 may also be operably connected to a Wi-Fi antenna 142. The Wi-Fi antenna 142 may be utilized as an external interface for mobile communication between the barrier controller 108 and the internet cloud 126 to send and retrieve data stored on the external server infrastructure 144 to store data within the barrier controller data repository. In an exemplary embodiment, the Wi-Fi antenna 142 may be configured to connect to Wi-Fi, WiMax, GSM, GPRS, or LTE wireless connection to send and receive one or more data files through the internet cloud 126 to/from the external server infrastructure 144. In one embodiment, the barrier controller 108 may send a command to the Wi-Fi antenna 142 to communicate with the internet cloud 126 to access the external server infrastructure 144 to store the current status of the barrier 104 as determined by the barrier controller 108.

In some embodiments, the barrier controller 108 may be operably connected to the barrier image sensors 146. As discussed above, the barrier image sensors 146 may be disposed near to the barrier 104 to capture one or more images of the moving path of the barrier 104. In one or more embodiments, the barrier image sensors 146 may provide barrier image data to the barrier controller 108. The barrier controller 108 may utilize the WI-FI antenna to communicate the barrier image data to be stored on the external server infrastructure 144. As discussed below, in some embodiments, the barrier control application 106 may utilize the TCU 120 to communicate with the external server infrastructure 144 over the internet cloud 126 to access the barrier image data by the application 106. The barrier image data may analyzed along with the sensor data provided by the vehicle sensors 124 to detect if at least one individual and/or at least one object located within the moving path of the barrier 104.

The Barrier Movement Control Application and Related Methods

The components of the barrier control application 106 will now be described according to an exemplary embodiment and with reference to FIG. 1. In an exemplary embodiment, the barrier control application 106 may be stored on the storage unit 116 of the vehicle 102. In alternate embodiments, the barrier control application 106 may be stored on the external server infrastructure 144 and may be accessed by the TCU 120 to be executed by the ECU 110 and/or the head unit 112 of the vehicle 102. As stated above, the barrier control application 106 may be executed when a battery/accessory state of the vehicle 102 is enabled. Therefore, the vehicle 102 (e.g., engine) does not have to be fully enabled for the ECU 110 or the head unit 112 to execute the barrier control application 106.

In an exemplary embodiment, the barrier control application 106 may include a location determinant module 148, a zone determinant module 150, a barrier status determinant module 152, a barrier control module 154, and a barrier status presentation module 156. It is to be appreciated that the barrier control application 106 may include additional modules and/or sub-modules that are configured to execute one or more functions of the application 106. As will be described in more detail below, the location determinant module 148 may be utilized to determine the location of the vehicle 102 with respect to the (location of) the barrier 104. The zone determinant module 150 may determine a plurality of zones that are utilized to send one or more signals between the vehicle communication system 128 and the transceiver 140.

The barrier status determinant module 152 may be utilized to access sensor data from the vehicle sensors 124 and barrier image data from the external server infrastructure 144 and analyze the data to detect if at least one individual or at least one object is located within the movement path of the barrier 104 to inhibit automatic movement of the barrier 104. The barrier status determinant module 152 may additionally determine the status of the barrier 104 as the opened state, the partially opened state, or the closed state and may communicate the current status of the barrier 104 to the barrier status presentation module 156.

The barrier control module 154 may be utilized to remotely control the movement of the barrier 104 to traverse the barrier 104 to the opened state, the closed state, or the partially opened state based on the current status of the barrier 104 when the movement path of the barrier 104 is detected to be clear (i.e., no individuals or objects are detected within the movement path of the barrier 104). Further, the barrier status presentation module 156 may receive data from the barrier status determinant module 152 and/or the barrier control module 154 and may communicate with the infotainment system 118 and may present the barrier movement inhibition alert when the at least one individual and/or the at least one object is detected within the movement path of the barrier 104.

As discussed, the user may create the barrier profile associated with the barrier 104. In one embodiment, upon creation of the barrier profile, the location determinant module 148 may communicate with the navigation system 132 of the vehicle 102 to determine the geo-location associated with the barrier 104. As discussed below, the geo-location associated with the barrier 104 may be used to determine if the vehicle 102 is being driven and is arriving towards the barrier 104 (i.e., the geo-location associated with the barrier 104). The geo-location associated with the barrier 104 may also be used to determine if the vehicle 102 is being driven and is departing away from the barrier 104 (i.e., the geo-location associated with the barrier 104). In some embodiments, the geo-location associated with the barrier 104 may additionally be used to determine if the vehicle 102 is located (e.g., parked) within a predetermined distance of the barrier 104 that may include the area enclosed by the barrier 104.

In one embodiment, the user may input a user interface icon (not shown) via the vehicle HMI presented on the display unit 114 to create the barrier profile associated with the barrier 104. For example, the driver of the vehicle 102 may wish to create the barrier profile that is associated to the barrier 104 (e.g., garage door) located at the driver's home to enable the application 106 to communicate with the barrier controller 108 (e.g., garage door opener) associated with the barrier 104. Once the user selects the respective user interface icon and inputs the name assigned to the barrier 104 per the user's choosing, the barrier control application 106 may store the barrier profile on the storage unit 116 of the vehicle 102. Upon storing the barrier profile on the storage unit 116, a respective indication may be communicated to the location determinant module 148 indicating that the user has setup the barrier profile associated with the barrier 104.

In an exemplary embodiment, upon receiving the indication that the user has setup the barrier profile associated with the barrier 104, the location determinant module 148 may present a barrier location determination user interface (not shown) to the user. The barrier location determination user interface may be utilized by the user to actuate the determination of the geo-location of the barrier 104 when the vehicle 102 is located within the area enclosed by the barrier 104. More specifically, the barrier location determination user interface may include a user interface object(s) that may be inputted by the user to indicate that the vehicle 102 is within the area enclosed by the barrier 104 to enable the zone determinant module 150 to determine the geo-location of the barrier 104.

In one embodiment, the location determinant module 148 may communicate with the navigation system 132 of the vehicle 102 to determine the geo-location of the barrier 104. The navigation system 132 may access the GPS 132a to determine locational coordinates associated with the location of the vehicle 102. In one embodiment, the navigation system 132 may further access the map database 130a to determine if a highlighted location that may include a dwelling/building that includes the barrier 104 is located within a predetermined proximity of the vehicle 102 (i.e., of the locational coordinates associated with the location of the vehicle 102 as determined by the GPS 132a).

The highlighted location may be indicative of a home location saved by the user via the map user interface, a point of interest presented on the map interface, and/or a physical address that is included within the map database 130a. In one embodiment, when the map database 130a communicates that the highlighted location is located within the predetermined proximity of the vehicle 102, the location determinant module 148 may ask the user (via the barrier location determination user interface) if the user wishes to interpret the highlighted location as the geo-location associated with the barrier 104. If the user does wish to interpret the highlighted location as the geo-location associated with the barrier 104, the location determinant module 148 may access the barrier profile and populate the locational coordinates associated with the highlighted location as the geo-location associated with the barrier 104.

In an additional embodiment, the user may utilize the map user interface of the navigation system 132 to input a saved location that may be utilized by the application 106 as the location of the barrier 104. For example, the user may input a home location as a saved location on the map user interface. The user may additionally utilize the barrier configuration user interface to input the saved location as the location of the barrier 104. The location determinant module 148 may communicate with the navigation system 132 to determine the geo-location of the barrier 104 based on the saved location. The location determinant module 148 may further access the barrier profile stored on the storage unit 116 and may populate the locational coordinates associated with the saved location as the geo-location associated with the barrier 104.

As discussed below, the stored geo-location may be used by the application 106 to determine if the vehicle 102 is located within a predetermined vicinity of the barrier 104, if the vehicle 102 is located within the area enclosed by the barrier 104, if the vehicle 102 is arriving towards the barrier 104, or if the vehicle 102 is departing away from the barrier 104. Additionally, the stored geo-location may be used by the application 106 to determine the one or more zones associated with the barrier 104 utilized by the application 106 to send one or more signals to the barrier controller 108 based on the location and/or a traveling direction of the vehicle 102 with respect to the barrier 104.

In an exemplary embodiment, the location determinant module 148 may also be utilized to determine the location and/or the traveling direction of the vehicle 102 with respect to the barrier 104. In particular, the location determinant module 148 may determine if the vehicle 102 is located within the area enclosed by the barrier 104 (e.g., a garage), the vehicle 102 is located within the predetermined vicinity of the barrier 104 (e.g., 10 m from the barrier), the vehicle 102 is arriving toward the barrier 104 (e.g., vehicle 102 is being driven to the home where the barrier 104 is located), or the vehicle 102 is departing from the barrier 104 (e.g., vehicle 102 is being driven away from the home where the barrier 104 is located).

In one embodiment, the location determinant module 148 may communicate with the navigation system 132 of the vehicle 102 to determine the locational coordinates associated with the (location of the) vehicle 102. In particular, as the vehicle 102 is being driven or is parked, the location determinant module 148 may communicate with the navigation system 132 to continually determine the locational coordinates associated with the vehicle 102 as provided by the GPS 132a. The location determinant module 148 may also access the barrier profile stored on the storage unit 116 to retrieve the geo-location associated with the barrier 104. Upon retrieving the geo-location associated with the barrier 104, the location determinant module 148 may communicate with the navigation system 132 to determine if the vehicle 102 is within a predetermined distance (e.g., within a 0-200 yards) of the geo-location associated with the barrier 104.

If the navigation system 132 determines that the vehicle 102 is within the predetermined vicinity of the geo-location associated with the barrier 104, the location determinant module 148 may communicate with the navigation system 132 to further determine if the locational coordinates associated with the vehicle 102 match (e.g., within a predetermined GPS geo-fence threshold that may encompass portions of the area enclosed by the barrier 104) the geo-location associated with the barrier 104.

In one embodiment, when the navigation system 132 determines that the locational coordinates associated with the vehicle 102 match the geo-location associated with the barrier 104, the navigation system 132 may communicate respective data to the location determinant module 148. The location determinant module 148 may determine that the vehicle 102 is located within the area enclosed by the barrier 104 and may communicate the location of the vehicle 102 to the other modules 148-156 of the application 106. Similarly, when the navigation system 132 determines that the locational coordinates associated with the vehicle 102 are not including the area enclosed by the barrier 104 but are within the predetermined vicinity of the geo-location associated with the barrier 104, the navigation system 132 may communicate respective data to the location determinant module 148. The location determinant module 148 may determine that the vehicle 102 is located within the predetermined vicinity of the barrier 104 and may communicate the location of the vehicle 102 to the other modules 148-156 of the application 106.

In one or more embodiments, the location determinant module 148 may determine when the vehicle 102 is arriving towards the barrier 104 or departing from the barrier 104 based on the stored geo-location of the barrier 104. In particular, when the location determinant module 148 determines that the vehicle 102 is not located within the area enclosed by the barrier 104 or within the predetermined vicinity of the barrier 104, but that the vehicle 102 is located within the predetermined distance of the geo-location associated with the barrier 104, the location determinant module 148 may communicate with the vehicle dynamics sensors 138 to determine if the vehicle 102 is enabled (e.g., engine is enabled) and is moving (e.g., vehicle 102 is being driven). If it is determined that the vehicle 102 is enabled and is moving, the location determinant module 148 may communicate with the navigation system 132 to utilize the GPS 132a and the map database 132b to evaluate if the vehicle 102 is being driven away from geo-location associated with the barrier 104. If the navigation system 132 determines that a distance between the locational coordinates of the vehicle 102, as provided by the GPS 132a and the geo-location of the barrier 104 are increasing, the navigation system 132 may communicate respective data to the location determinant module 148. The location determinant module 148 may determine that the vehicle 102 is departing away from the barrier 104 and may communicate the location and traveling direction of the vehicle 102 to the other modules 148-154 of the application 106.

If the location determinant module 148 determines that the vehicle 102 is not located within the first predetermined distance of the geo-location associated with the barrier 104, the location determinant module 148 may communicate with the vehicle dynamics sensors 138 to determine if the vehicle 102 is enabled (e.g., engine is enabled) and is moving (e.g., vehicle 102 is being driven). If it is determined that the vehicle 102 is enabled and is moving, the location determinant module 148 may communicate with the navigation system 132 to determine if the vehicle 102 is located within an additional predetermined distance (e.g., 1 mile) of the geo-location associated with the barrier 104 and if the vehicle 102 is arriving towards the barrier 104. In particular, if the navigation system 132 determines that the vehicle 102 is located within the additional predetermined distance of the barrier 104, the navigation system 132 may utilize the GPS 132a and the map database 132b to evaluate if the vehicle 102 is being driven towards the geo-location associated with the barrier 104. If the navigation system 132 determines that a distance between the locational coordinates of the vehicle 102, as provided by the GPS 132a and the geo-location of the barrier 104 is decreasing, the navigation system 132 may communicate respective data to the location determinant module 148. The location determinant module 148 may determine that the vehicle 102 is arriving towards the barrier 104 and may communicate the location and traveling direction of the vehicle 102 to the other modules 148-156 of the application 106.

In one embodiment, during daily operation of the vehicle 102, when the vehicle 102 is determined to be arriving towards the barrier 104 or departing away from the barrier 104, the image sensors 134, and the RADAR/LADAR sensors 136 may make one or more sensor based determinations that pertain to the full expanse of the movement path of the barrier 104 at one or more geo-locations. In particular, one or more geo-locations may be utilized as sensing locations that are applied during the arrival of the vehicle 102 towards the barrier 104 to sense and determine if at least one object and/or at least one individual is located within the movement path of the barrier 104. Additionally, one or more geo-locations may be utilized as sensing locations that are applied during the departure of the vehicle 102 from the barrier 104 to sense and determine if at least one individual and/or object is located within the movement path of the barrier 104. More specifically, the sensing locations may be determined based on the capability of the image sensors 134 to capture images of the full expanse of the movement path of barrier 104 and/or the capability of the RADAR/LADAR sensors to sense obstacles that may be located within the full expanse of the movement path of the barrier 104.

In an exemplary embodiment, respective (e.g., separate) sensing locations may be applied by the location determinant module 148 that are applicable when the vehicle 102 is arriving towards the barrier 104 and when the vehicle 102 is departing away from the barrier 104. The sensing locations may be determined by the location determinant module 148 based on foremost locations at which the image sensors 134 and/or the RADAR/LADAR sensors 136 may initially sense a full expanse of the movement path of the barrier 104 as the vehicle 102 arrives towards the barrier 104 or departs away from the barrier 104. For example, the sensing locations may be respectively provided at geo-locations that are located a certain distance from the barrier 104 at which the image sensors 134 are capable of capturing and providing stereoscopic images of the full expanse of the movement path of the barrier 104 when the vehicle 102 is arriving towards the barrier 104 or departing away from the barrier 104.

In some embodiments, the geo-locations at which the image sensors 134 are initially capable of capturing images of the full expanse of the moving path of the barrier 104 may be aggregated with the geo-locations at which the RADAR/LADAR sensors 136 may be able to sense obstacles within the full expanse of the movement path of the barrier 104. The aggregation of geo-locations may be made to determine sensing locations that are based collectively on image data and sensor wave data that are respectively applicable during the arrival of the vehicle 102 towards the barrier 104 and during the departure of the vehicle 102 away from the barrier 104.

In one or more embodiments, the image sensors 134 and the RADAR/LADAR sensors 136 may additionally determine attributes related to the barrier 104 and the surrounding environment of the barrier 104, hereinafter referred to as barrier attributes. The barrier attributes may include, but may not be limited to, a moving direction of the barrier 104 that may include an upward/downward movement, inward/outward movement, as the barrier 104 is traversed to the opened state or the closed state, and data pertaining to the driveways/roads leading up to the barrier 104 (e.g., slope of the driveway leading up to and at the movement path of the barrier 104).

Upon determining the sensing locations applicable during the arrival of the vehicle 102 towards the barrier 104 and during the departure of the vehicle 102 away from the barrier 104, the location determinant module 148 may continually populate the data pertaining to the sensing locations within the barrier profile associated with the barrier 104 and stored on the storage unit 116. Additionally, the location determinant module 148 may populate the barrier attributes within the barrier profile associated with the barrier 104 to be utilized by the barrier control application 106. In some embodiments, the barrier status determinant module 152 may access the barrier attributes from the barrier profile to more accurately evaluate sensor data provided by the vehicle sensors 124 to detect the presence of at least one individual and/or at least one object that is located within the movement path of the barrier 104.

In an exemplary embodiment, the zone determinant module 150 of the barrier control application 106 may provide a plurality of zones associated with the barrier 104. The plurality of zones may include plurality of areas located at a plurality of distances from the barrier 104 and may be provided at specific locations based on the sensing locations utilized during the arrival or departure of the vehicle 102. The plurality of zones may be used to trigger the sending (e.g., transmission) of RF signals by the vehicle communication system 128 to the transceiver 140 operably connected to the barrier controller 108. As discussed in more detail below, one or more specific zones of the plurality of zones may be associated with the barrier 104 and utilized to send one or more specific signals from the barrier status determinant module 152 or the barrier control module 154 (via the vehicle communication system 128) to the barrier controller 108 (via the transceiver 140) when the vehicle 102 is determined to be arriving towards the barrier 104 and entering the zone(s).

Additionally, one or more specific zones of the plurality of zones may be associated with the barrier 104 and utilized to send one or more specific signals from the barrier status determinant module 152 or the barrier control module 154 to the barrier controller 108 when the vehicle 102 is determined to be departing away from the barrier 104 and exiting the zone(s). In particular, the plurality of zones may be specifically associated with the location and/or traveling direction of the vehicle 102 as communicated by the location determinant module 148 when it is determined that the vehicle 102 is arriving towards the barrier 104 or departing away from the barrier 104, as discussed above.

In one or more embodiments, when the vehicle 102 is determined to enter or exit one or more of the respective zones, the barrier status determinant module 152 may utilize the vehicle communication system 128 to send (e.g., transmit) at least one status request signal to the barrier controller 108 to determine the state of the barrier 104. The barrier status determinant module 152 may also analyze sensor data provided by the vehicle sensor 124 upon determining that the vehicle 102 is within a sensing distance of the barrier 104 to determine if the individual(s) and/or object(s) is located within the movement path of the barrier 104. If the barrier status determinant module 152 does not determine that the individual(s) and/or object(s) are located within the movement path of the barrier 104, when the vehicle 102 is determined to enter or exit one or more of the respective zones, the barrier control module 154 may automatically send at least one barrier control signal to the barrier controller 108 to actuate the automatic movement of the barrier 104 to traverse the barrier 104 to the opened state or the closed state based on the traveling direction of the vehicle 102.

Figure 2:
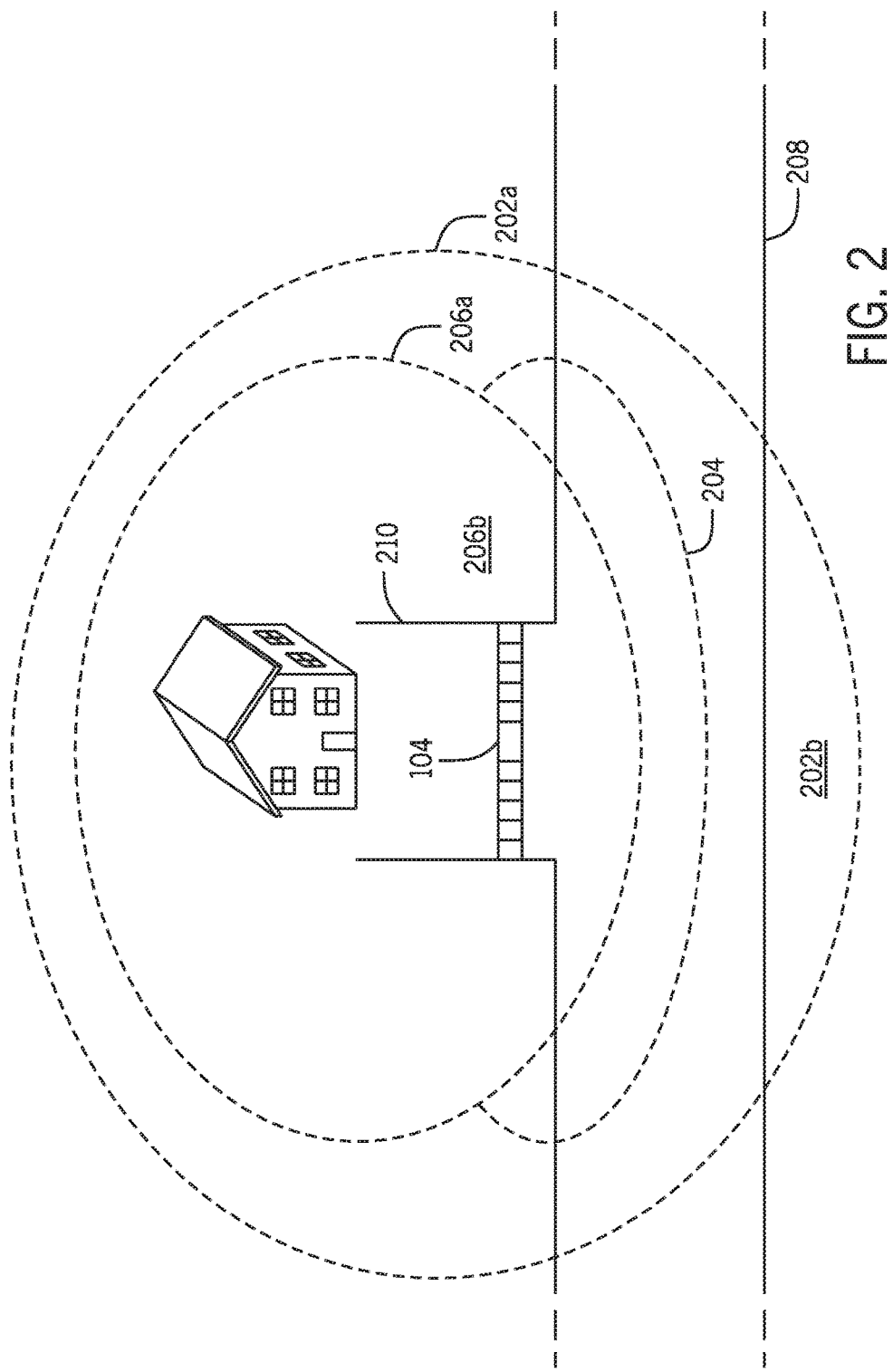
FIG. 2 is an illustrative example of a plurality of zones associated with the barrier that may be applied when the vehicle is determined to be arriving towards the barrier according to an exemplary embodiment.

FIG. 2 is an illustrative example of the plurality of zones associated with the barrier 104 that may be applied when the vehicle 102 is determined to be arriving towards the barrier 104 according to an exemplary embodiment. As shown in the illustrative example of FIG. 2, a boundary 202*a* of an arrival status zone 202*b* may be determined by the zone determinant module 150 and may be provided as an RF communication trigger point for the barrier status determinant module 152 to utilize the vehicle communication system 128 to send (e.g., transmit) one or more status request signals (e.g., RF signals) to the transceiver 140 to be evaluated by the barrier controller 108. Additionally a boundary 206*a* of a barrier opening zone 206*b* may be determined by the zone determinant module 150 and may be provided as an automatic trigger point for the barrier control system 130 to send the barrier control signal(s) to the barrier 104 to automatically move the barrier 104.

In one embodiment, during the sensor training mode, the zone determinant module 150 may communicate with the image sensors 134 and the RADAR/LADAR sensors 136 to determine specific sensing locations 204 within the predetermined vicinity of the barrier 104 as the vehicle 102 is arriving towards the barrier 104. In other words, the sensing locations 204 may be determined based on foremost locations during the arrival of the vehicle 102 towards the barrier 104 at which the image sensors 134 and/or the RADAR/LADAR sensors 136 may sense the full expanse movement path of the barrier 104. For example, the sensing locations 204 may be provided at a furthest distance from the barrier 104 at which the image sensors 134 are capable of capturing and providing stereoscopic images of the movement path of the barrier 104. Also, the sensing locations 204 may be provided at a furthest distance from the barrier 104 at which the RADAR/LADAR sensors 136 are able to send and receive radar waves/light pulses and sense obstacles within the full expanse of the movement path that may be used to determine if individual(s) and/or object(s) may be located within the movement path of the barrier 104.

In one embodiment, the zone determinant module 150 may determine the location at which to provide the boundary 202a of the arrival status zone 202b as a location that ensures that the sensing locations 204 are located within the arrival status zone 202b to accordingly determine if at least one individual and/or at least one object is located within the moving path of the barrier 104 at an earliest possible point in time with respect to the vehicle 102 approaching the barrier 104. More particularly, the location of the boundary 202a of the arrival status zone 202b may be provided for the barrier status determinant module 152 to have an adequate amount of time to inhibit sending of the barrier control signal before the vehicle 102 enters the barrier opening zone 206b.

In some embodiments, in addition to taking the sensing locations 204 into account when determining the location of the boundary 202a of the arrival status zone 202b, the zone determinant module 150 may take into account the location at which the vehicle 102 may transmit and receive RF signals to successfully communicate with the barrier controller 108 at an earliest point in time to determine the current state of the barrier 104. This functionality may ensure that the barrier control signal(s) is sent to traverse the barrier 104 to the opened state as the vehicle 102 approaches the barrier 104 upon determining that the moving path of the barrier 104 is clear without requiring the vehicle 102 to stop and wait for the barrier 104 to fully traverse to the opened state.

In an exemplary embodiment, upon determining the location of the arrival status zone 202b, the zone determinant module 150 may store a plurality of GPS coordinates associated with the boundary 202a of the arrival status zone 202b. In one or more embodiments, the zone determinant module 150 may communicate with the navigation system 132 to determine the plurality of GPS coordinates (e.g., latitude x, longitude y) of the areas that include the boundary 202a of the arrival status zone 202b. Upon determining the plurality of GPS coordinates associated with the portions of the boundary 202a, the navigation system 132 may communicate the plurality of GPS coordinates to the zone determinant module 150.

Upon determining the location of the arrival status zone 202b, the zone determinant module 150 may access the barrier profile associated with the barrier 104 stored on the storage unit 116 and may populate the plurality of GPS coordinates associated with portions of the boundary 202a of the arrival status zone 202b. As discussed below, the plurality of GPS coordinates populated within the barrier profile may be evaluated in order to send the status request signal(s) to the barrier controller 108 upon the vehicle 102 entering the arrival status zone 202b during the arrival of the vehicle 102 towards the barrier 104.

Upon sending the status request signal(s), as the vehicle 102 continues to travel towards the barrier 104, the location determinant module 148 may access the barrier profile associated with the barrier 104 to retrieve the sensing locations 204 at which the image sensors 134 and/or the RADAR/LADAR sensors 136 are capable of capturing/sensing the movement path of the barrier 104. As the vehicle 102 continues to travel and arrive towards the barrier 104, the location determinant module 148 may communicate with the barrier status determinant module 152 when the vehicle 102 reaches one of the sensing locations 204. The barrier status determinant module 152 may responsively communicate with the image sensors 134 and/or the RADA/LADAR sensors 136 to receive image data and/or sensor wave data and may analyze the data to determine if the individual(s) and/or the object(s) is located within the movement path of the barrier 104. Consequently, the barrier status determinant module 152 may inhibit the automatic sending of the barrier control signal(s) that occurs when the vehicle 102 enters the barrier opening zone 206b or may allow the sending of the barrier control signal(s) when the vehicle 102 enters the barrier opening zone 206b based on if the individual(s) and/or object(s) are determined to be located within the movement path of the barrier 104.

In an exemplary embodiment, the zone determinant module 150 may determine the barrier opening zone 206b at a determined distance from the barrier 104. As shown in the illustrative example of FIG. 2, in one embodiment, the size of the barrier opening zone 206b may be based on one or more variables that ensures that the boundary 206a of the barrier opening zone 206b may be provided at a determined adequate distance from the sensing locations 204 and the barrier 104 for the application 106 to inhibit or allow the sending of the barrier control signal(s) to traverse the barrier 104 to the opened state as the vehicle 102 approaches the barrier 104. The zone determinant module 150 may determine the boundary 206a of the barrier opening zone 206b at a determined adequate distance (e.g., 50 m) from the boundary 202a of the arrival status zone 202b and the determined adequate distance (e.g., 30 m) from the sensing locations 204. In particular, upon sending the status request signal(s) to determine the status of the barrier 104, the vehicle 102 will travel the determined adequate distances and the vehicle sensors 124 will sense the movement path of the barrier 104 to be analyzed as the vehicle 102 continues to travel toward the barrier 104 before possibly sending the barrier control signal(s) when the vehicle 102 enters the barrier opening zone 206b.

In some embodiments, in addition to taking the location of the arrival status zone 202b and the sensing locations 204 into account, the zone determinant module 150 may analyze data pertaining to the surrounding environment of the vehicle 102 provided by the map database 132b and may also determine the barrier opening zone 206b according to one or more environmental variables. The one or more environmental variables may include, but are not limited to, the length of the street(s) 208 within the vicinity of the barrier 104, the length of the driveway(s) 210 leading up to the barrier 104, the location of the surrounding structures/object(s) within the vicinity of the barrier 104, and the like.

In particular, the zone determinant module 150 may determine the size of the barrier opening zone 206b to ensure that the barrier control signal(s) may be transmitted to the transceiver 140 at a time that the vehicle 102 is at a requisite distance from the barrier 104. This functionality may ensure that upon determining that the movement path of the barrier 104 is clear, the barrier control signal(s) are sent at an appropriate time to fully open the barrier 104 upon the arrival of the vehicle 102 towards the barrier 104 without compromising the security of contents located behind the barrier 104. For example, in a scenario where the barrier 104 is located further from a street 208 that is used to approach the barrier 104, the barrier opening zone 206b may include a smaller area surrounding the barrier 104 than a scenario where the barrier 104 is located closer to the street 208.

Upon determining the location of the barrier opening zone 206b, the zone determinant module 150 may communicate with the navigation system 132 to determine the plurality of GPS coordinates (e.g., latitude x, longitude y) of the areas that include the boundary 206a of the barrier opening zone 206b. Upon determining the plurality of GPS coordinates associated with the portions of the boundary 206a, the navigation system 132 may communicate the plurality of GPS coordinates to the zone determinant module 150.

The zone determinant module 150 may access the barrier profile associated with the barrier 104 stored on the storage unit 116 and may populate the plurality of GPS coordinates associated with portions of the boundary 206a of the barrier opening zone 206b. As discussed below, the plurality of GPS coordinates populated within the barrier profile may be evaluated in order to send the barrier control signal(s) to the barrier controller 108 upon the vehicle 102 entering the barrier opening zone 206b during the arrival of the vehicle 102 towards the barrier 104.

It is to be appreciated that the zone determinant module 150 may determine multiple respective arrival status zones and barrier opening zones that may be utilized for multiple barriers. Additionally, multiple sensing locations may be applied by the location determinant module 148 that may be utilized with respect to multiple barriers. For example, if the home of the user includes a gate as a first barrier and a garage door as a second barrier, the location determinant module 148 may determine sensing locations specifically pertaining to the gate and sensing locations specifically pertaining to the garage door as the vehicle 102 arrives towards the gate and the garage door. Additionally, the zone determinant module 150 may determine an arrival status zone pertaining to the gate and a separate arriving barrier status zone pertaining to the garage door. The zone determinant module 150 may further determine a barrier opening zone pertaining to the gate and a separate barrier opening zone pertaining to the garage door.

Figure 3:
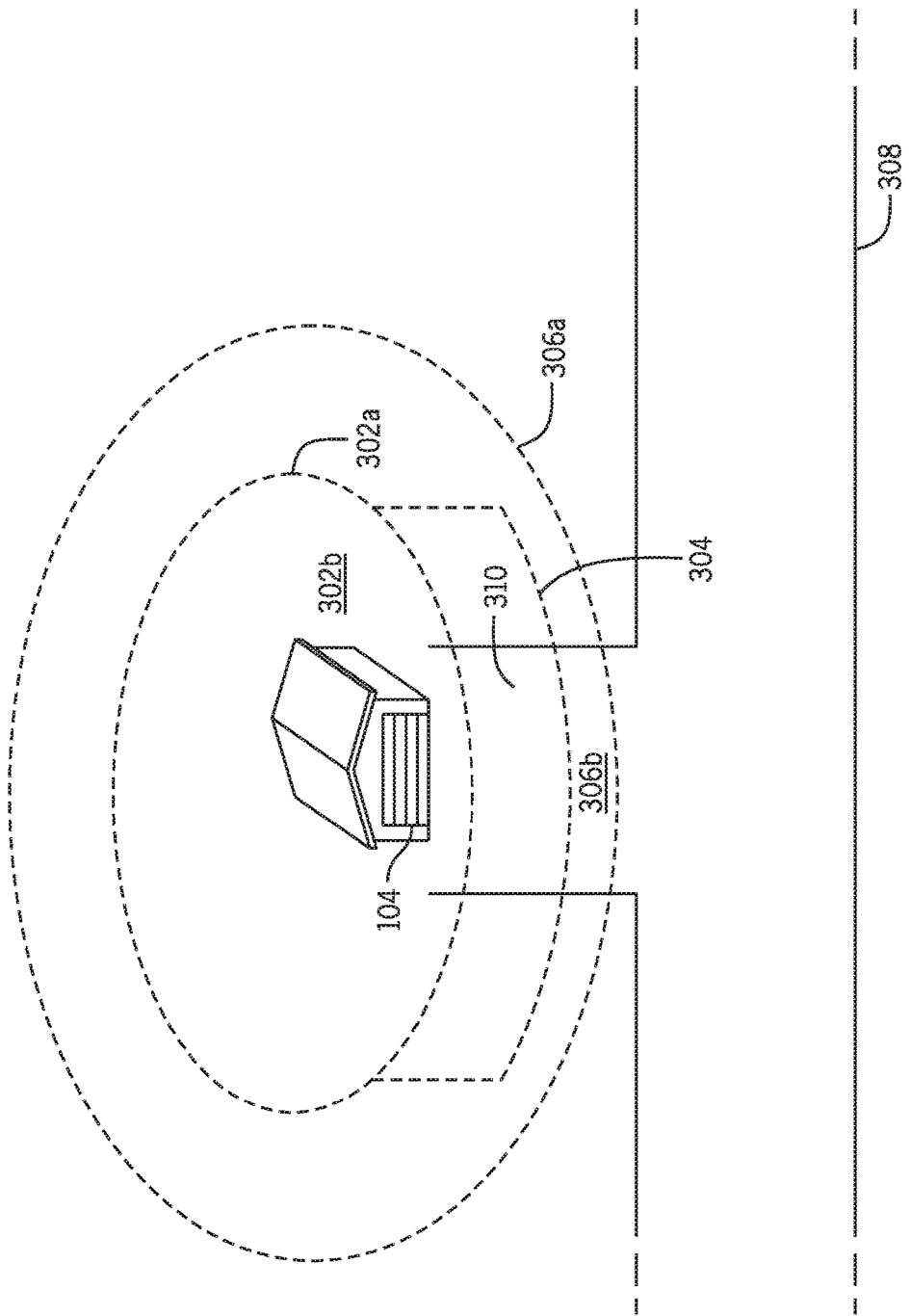
FIG. 3 is an illustrative example of a plurality of zones associated with the barrier that may be applied when the vehicle is determined to be departing away from the barrier according to an exemplary embodiment.

FIG. 3 is an illustrative example of the plurality of zones associated with the barrier 104 that may be applied when the vehicle 102 is determined to be departing away from the barrier 104 according to an exemplary embodiment. As shown in the illustrative example of FIG. 3, a departure status zone 302b may be determined by the zone determinant module 150 and may be provided as an RF communication trigger point for the barrier status determinant module 152 to utilize the vehicle communication system 128 to send at least one status request signal to the transceiver 140 to be evaluated by the barrier controller 108. Additionally, a boundary 306a of a barrier closing zone 306b may be determined by the zone determinant module 150 and may be provided as an automatic trigger point for the barrier control system 130 to send the barrier control signal(s) to the barrier 104 to automatically move the barrier 104.

In particular, as the vehicle 102 is departing from the barrier 104 (e.g., reversing away from the barrier 104), the vehicle 102 may exit the departure status zone 302b by crossing a boundary 302a of the departure status zone 302b. Upon crossing the boundary 302a, the barrier status determinant module 152 may utilize the vehicle communication system 128 to determine the current status of the barrier 104. As discussed below in more detail, the current status of the barrier 104 may be used to determine if the barrier control module 154 may send the barrier control signal(s) to traverse the barrier 104 to the closed state upon the vehicle 102 exiting a barrier closing zone 306b if it is determined that the movement path of the barrier 104 is clear.

In one or more embodiments, the zone determinant module 150 may determine the location and size of the departure status zone 302b according to sensing locations 304 that are determined within the predetermined vicinity of the barrier 104. In one embodiment, upon determining the current status of the barrier 104, as the vehicle 102 continues to travel away from the barrier 104, the location determinant module 148 may access the barrier profile associated with the barrier 104 to retrieve the sensing locations 304 at which the image sensors 134 and/or the RADAR/LADAR sensors 136 are capable of sensing the full expanse of the movement path of the barrier 104 as the vehicle 102 is departing away from the barrier 104. As the vehicle 102 continues to travel away from the barrier 104, the location determinant module 148 may communicate with the barrier status determinant module 152 when the vehicle 102 reaches one of the sensing locations 304. The barrier status determinant module 152 may responsively communicate with the image sensors 134 and/or the RADA/LADAR sensors 136 to receive image data and/or sensor wave data and may analyze the data to determine if at least one individual and/or at least one object is located within the movement path of the barrier 104. Consequently, the barrier status determinant module 152 may inhibit the automatic sending of the barrier control signal(s) that occurs when the vehicle 102 exits the barrier closing zone 306b or may allow the sending of the barrier control signal(s) when the vehicle 102 exits the barrier closing zone 306b based on if the individual(s) and/or object(s) are determined to be located within the movement path of the barrier 104.

In one embodiment, the zone determinant module 150 may determine the location at which to provide the boundary 302a of the departure status zone 302b as a location that ensures that the sensing locations 304 are located within the departure status zone 302b to accordingly determine if the individual(s) and/or object(s) are located within the moving path of the barrier 104 at an earliest possible point in time before the vehicle 102 enters the barrier closing zone 306b. More particularly, the location of the boundary 302a of the departure status zone 302b may be provided for the barrier status determinant module 152 to have an adequate amount of time to inhibit sending of the barrier control signal before the vehicle 102 exits the barrier closing zone 306b.

In some embodiments, in addition to taking the sensing locations 304 into account when determining the location of the boundary 302a of the departure status zone 302b, the zone determinant module 150 may also take into account the location at which the vehicle 102 may determine the current status of the barrier 104 at a requisite time to determine if the movement path of the barrier 104 is clear to allow or inhibit the sending of the barrier control signal(s) as the vehicle 102 departs away from the barrier 104. Upon determining the departure status zone 302b at the first determined distance from the barrier 104, the zone determinant module 150 may communicate with the navigation system 132 to determine the plurality of GPS coordinates (e.g., latitude x, longitude y) of the areas that include the boundary 402a of the departure status zone 302b.

Upon determining the plurality of GPS coordinates associated with the portions of the boundary 302a of the departure status zone 302b, the navigation system 132 may communicate the plurality of GPS coordinates to the zone determinant module 150. The zone determinant module 150 may access the barrier profile associated with the barrier 104 stored on the storage unit 116 and may populate the plurality of GPS coordinates associated with portions of the boundary 302a of the departure status zone 302b. As discussed below, the plurality of GPS coordinates populated within the barrier profile may be evaluated in order to send the status request signal(s) to the barrier controller 108 upon the vehicle 102 exiting the departure status zone 302b during the departure of the vehicle 102 away from the barrier 104.

In an exemplary embodiment, the zone determinant module 150 may additionally determine the barrier closing zone 306b at a determined distance from the barrier 104 and the sensing locations 304. With continued reference to the illustrative example of FIG. 3, in one embodiment, the size of the barrier closing zone 306b may be based on one or more variables that ensures that the boundary 306a of the barrier closing zone 306b may be provided at a determined adequate distance from the sensing locations 204 and the barrier 104 for the application 106 to allow or inhibit the sending of the barrier control signal(s) to traverse the barrier 104 to the closed state before the vehicle 102 is out of a RF communication range with the barrier controller 108. In particular, the zone determinant module 150 may determine that the boundary 306a of the barrier closing zone 306b is to be provided at a determined adequate distance (e.g., 50 m) from the boundary 302a of the departure status zone 302b and the determined adequate distance (e.g., 30 m) from the sensing locations 304. As an illustrative example, upon sending the status request signal(s) to determine the status of the barrier 104, the vehicle 102 will travel the determined adequate distances and the vehicle sensors 124 will sense the movement path of the barrier 104 to be analyzed as the vehicle 102 continues to travel away from the barrier 104 before possibly sending the barrier control signal(s) when the vehicle 102 exits the barrier closing zone 306b or inhibiting the sending of the barrier control signal(s).

In some embodiments, in addition to taking the location of the departure status zone 302b and the sensing locations 304 into account, the zone determinant module 150 may analyze data pertaining to the surrounding environment of the vehicle 102 provided by the map database 132b and may also determine the barrier closing zone 306b according to one or more environmental variables. For instance, the zone determinant module 150 may analyze the length of the street(s) 308 within the vicinity of the barrier 104, the length of the driveway(s) 310 leading up to the barrier 104, the location of the surrounding structures/object(s) within the vicinity of the barrier 104, and the like. In particular, the zone determinant module 150 may determine the size of the barrier closing zone 306b to ensure that the barrier control signal(s) may be transmitted to the transceiver 140 at a time that the vehicle 102 is at a requisite distance from the barrier 104. This functionality may ensure that upon determining that the movement path of the barrier 104 is clear, the barrier control signal(s) are sent at an appropriate time to fully close the barrier 104 during the departure of the vehicle 102 away from the barrier 104 before the vehicle communication system 128 is out of RF communication range with the transceiver 140. For example, in a scenario where the barrier 104 is located at the end of a long driveway 310 that is used to depart away from the barrier 104, the barrier closing zone 306b may include a smaller area surrounding the barrier 104 than a scenario where the barrier 104 is located at an end of a short driveway 310.

In an exemplary embodiment, upon determining the barrier closing zone 306b, the zone determinant module 150 may communicate with the navigation system 132 to determine the plurality of GPS coordinates (e.g., latitude x, longitude y) of the areas that include the boundary 306a of the barrier closing zone 306b. Upon determining the plurality of GPS coordinates associated with the portions of the boundary 306a, the navigation system 132 may communicate the plurality of GPS coordinates to the zone determinant module 150. The zone determinant module 150 may access the barrier profile associated with the barrier 104 stored on the storage unit 116 and may populate the plurality of GPS coordinates associated with portions of the boundary 306a of the barrier closing zone 306b. As discussed below, the plurality of GPS coordinates populated within the barrier profile may be evaluated in order to send the barrier control signal(s) to the barrier controller 108 upon the vehicle 102 exiting the barrier closing zone 306b during departure of the vehicle 102 away from the barrier 104.

It is to be appreciated that the zone determinant module 150 may determine multiple respective departure status zones and barrier closing zones that may be utilized for multiple barriers. Additionally, multiple sensing locations may be applied by the location determinant module 148 that may be utilized with respect to multiple barriers. For example, if the home of the user includes a gate as a first barrier and a garage door as a second barrier, the location determinant module 148 may determine sensing locations specifically pertaining to the gate and sensing locations specifically pertaining to the garage door as the vehicle 102 departs from the garage door and the gate. Additionally, the zone determinant module 150 may determine a departure status zone pertaining to the gate and a separate departure status zone pertaining to the garage door. The zone determinant module 150 may further determine a barrier closing zone pertaining to the gate and a separate barrier closing zone pertaining to the garage door.

Figure 4A:
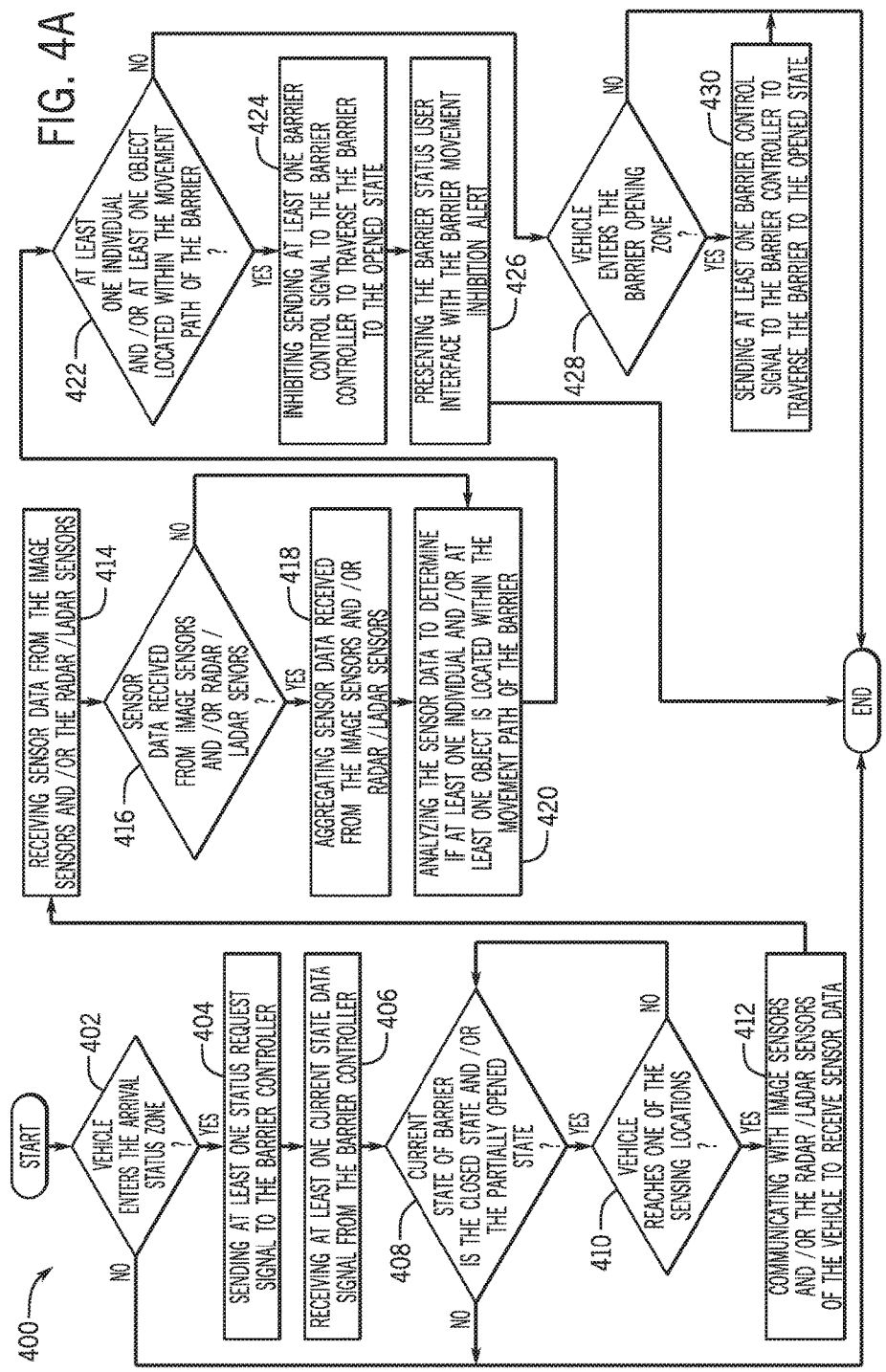
FIG. 4A is a process flow diagram of a method for inhibiting or providing automatic movement of the barrier when the vehicle is determined to be arriving towards the barrier according to an exemplary embodiment.
Figure 4B:
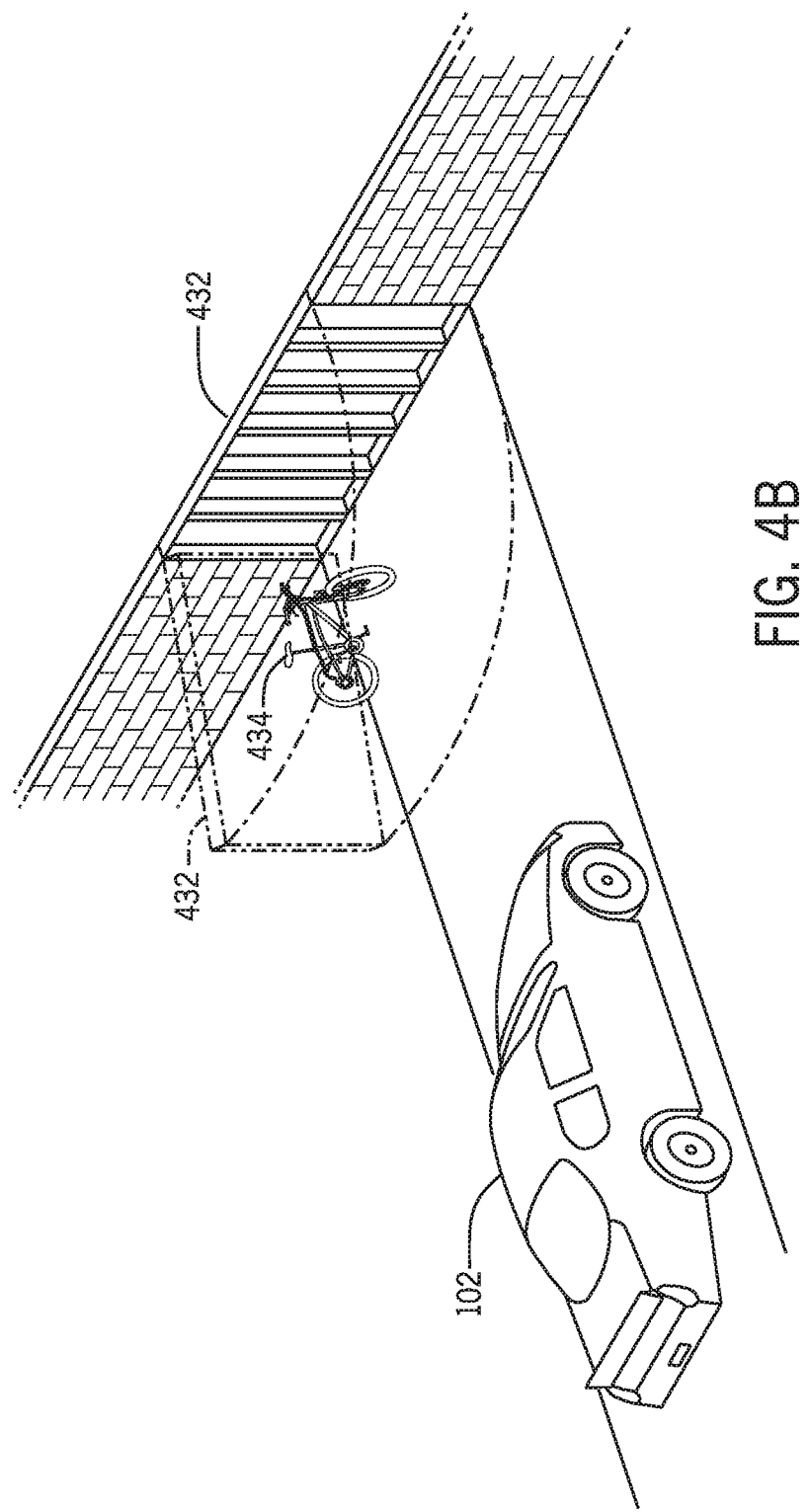
FIG. 4B is an illustrative example of a scenario in which the barrier control application may inhibit sending of at least one barrier control signal during the arrival of the vehicle towards the barrier according to an exemplary embodiment.

FIG. 4A is a process flow diagram of a method 400 for inhibiting or providing automatic movement of the barrier 104 when the vehicle 102 is determined to be arriving towards the barrier 104 according to an exemplary embodiment. FIG. 4A will be described with reference to the components of FIG. 1 though it is to be appreciated that the method 400 of FIG. 4A may be used with other systems and/or components. Additionally, the method 400 of FIG. 4A will be described with reference to the illustrative example of FIG. 2. The method 400 may begin at block 402, wherein the method 400 may include determining if the vehicle 102 enters the arrival status zone 202b. As discussed, when the location determinant module 148 determines that the vehicle 102 is arriving towards the barrier 104, the location determinant module 148 may communicate the location of the vehicle 102 and the traveling direction of the vehicle 102 to the zone determinant module 150. As discussed above, the zone determinant module 150 may determine the plurality of zones associated with the barrier 104 that specifically pertain to the arrival of the vehicle 102 towards the barrier 104.

Upon determining the arrival status zone 202b, the zone determinant module 150 may populate the barrier profile associated with the barrier 104 with the plurality of GPS coordinates associated with portions the boundary 202a of the arrival status zone 202b. In one embodiment, as the vehicle 102 is being driven, the location determinant module 148 may communicate with the navigation system 132 to continually determine the locational coordinates associated with the vehicle 102 as provided by the GPS 132a.

The location determinant module 148 may also access the barrier profile stored on the storage unit 116 and may communicate with the navigation system 132 to determine if the vehicle 102 is entering any of the portions of the boundary 202a of the arrival status zone 202b. More specifically, the location determinant module 148 may continually compare the locational coordinates of the vehicle 102 against the plurality of GPS coordinates associated with portions of the boundary 202a to determine if they overlap with one another. If it is determined that the overlapping of the locational coordinates of the vehicle 102 occurs with the plurality of GPS coordinates associated with portions of the boundary 202a, the location determinant module 148 may determine that the vehicle 102 enters the arrival status zone 202b. For example, if the vehicle 102 is being driven towards the barrier 104, the vehicle 102 may enter the arrival status zone 202b. In such a scenario, the location determinant module 148 may determine when the vehicle 102 enters the arrival status zone 202b once the vehicle 102 crosses one of the portions of the boundary 202a.

If it is determined that the vehicle 102 enters the arrival status zone 202b (at block 402), the method 400 may proceed to block 404, wherein the method 400 may include sending at least one status request signal to the barrier controller 108. In an exemplary embodiment, upon the location determinant module 148 determining that the vehicle 102 is crossing one of the portions of the boundary 202a to enter the arrival status zone 202b, the location determinant module 148 may communicate respective data to the barrier status determinant module 152. The barrier status determinant module 152 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 152 may send the status request data signal(s) to determine if the barrier 104 is currently in the opened state, the closed state, or the partially opened state.

The method 400 may proceed to block 406, wherein the method 400 may include receiving at least one current state data signal from the barrier controller 108. In one or more embodiments, the barrier controller 108 may evaluate the one or more status request signals received by the transceiver 140 and may determine the current state of the barrier 104. The barrier controller 108 may determine the current state as the opened state when the barrier 104 is in a fully opened positon. Additionally, the barrier controller 108 may determine the current state as the closed state when the barrier 104 is in a fully closed positon. In some embodiments, the barrier controller 108 may determine the current state of the barrier 104 as the partially opened state when the barrier 104 is partially opened. The barrier controller 108 may further determine the barrier traversing level of the barrier 104 (e.g., 65% open) when the current state of the barrier 104 is the partially opened state.

In an exemplary embodiment, upon determining the current state of the barrier 104, the barrier controller 108 may utilize the transceiver 140 to communicate the one or more current state data signals that include the current state of the barrier 104 as the opened state, the closed state, or the partially opened state to the vehicle communication system 128. In some embodiments, when the barrier 104 is determined to be in the partially opened state, the current data state data signal(s) may additionally include the barrier traversing level of the barrier 104. Upon evaluating the current state of the barrier 104, the barrier status determinant module 152 may communicate respective data to the barrier control module 154 to evaluate the current state of the barrier 104.

The method 400 may proceed to block 408, wherein the method 400 may include determining if the barrier 104 is in the closed state or the partially opened state. As discussed above, upon evaluating the current state of the barrier 104, the barrier status determinant module 152 may communicate respective data to the barrier control module 154 to evaluate the current state of the barrier 104. The barrier control module 154 may evaluate the current state and determine if the barrier 104 is in the closed state or the partially opened state as communicated by the barrier controller 108 (at block 406).

If it is determined that the current state of the barrier 104 is the closed state or the partially opened state (at block 408), the method 400 may proceed to block 410, wherein the method 400 may include determining if the vehicle 102 reaches one or more sensing locations. As discussed above, during daily operation of the vehicle 102, when the vehicle 102 is determined to be arriving towards the barrier 104, the image sensors 134, and/or the RADAR/LADAR sensors 136 may be able to make one or more sensor based determinations that may include specific geo-locations within the vicinity of the barrier 104 at which the sensing locations 204 are determined and applied. With respect to the approach of the vehicle 102 towards the barrier 104, the sensing locations 204 applied by the location determinant module 148 may be determined based on the foremost locations at which the image sensors 134 and/or the RADAR/LADAR sensors 136 may initially sense the full expanse of the movement path of the barrier 104. As discussed above, the geo-locations at which the image sensors 134 are initially capable of capturing images of the full expanse of the movement path of the barrier 104 may be utilized separately or may be aggregated with the geo-locations at which the RADAR/LADAR sensors 136 are initially capable of sensing obstacles within the full expanse of the movement path of the barrier 104.

In one embodiment, upon sending the status request signal(s), as the vehicle 102 continues to travel towards the barrier 104, the location determinant module 148 may access the barrier profile associated with the barrier 104 to retrieve the sensing locations 204 at which the image sensors 134 and/or the RADAR/LADAR sensors 136 are capable of capturing/sensing the full expanse of the movement path of the barrier 104. As the vehicle 102 continues to travel and arrive towards the barrier 104, the location determinant module 148 may utilize information related to the sensing locations 204 retrieved from the barrier profile to determine that the vehicle 102 reaches one of the sensing locations 204.

In another embodiment, the location determinant module 148 may determine that the vehicle 102 reaches one of the sensing locations 204 based on the receipt of one or more sensing signals sent by the image sensors 134 that indicate that the sensors 134 are able to and/or are capturing images of the full expanse of the movement path of the barrier 104 as the vehicle 102 is arriving towards the barrier 104. Additionally, or alternatively, the location determinant module 148 may determine that the vehicle 102 reaches one of the sensing locations 204 based on the receipt of one or more sensing signals sent by the RADAR/LADAR sensors 136 that the sensors 136 are capable of and/or are sensing obstacles that may be located within the full expanse of movement path of the barrier 104.

If it is determined that the vehicle 102 reaches one or more of the sensing locations 204 (at block 410), the method 400 may proceed to block 412, wherein the method 400 may include communicating with the image sensors 134 and/or the RADAR/LADAR sensors 136 of the vehicle 102 to receive sensor data. In an exemplary embodiment, upon determining that the vehicle 102 has reached one of the sensing locations 204, the location determinant module 148 may communicate respective data to the barrier status determinant module 152.

The method 400 may proceed to block 414, wherein the method 400 may include receiving sensor data from the image sensors 134 and/or the RADAR/LADAR sensors 136. In one or more embodiments, upon receiving data from the location determinant module 148 pertaining to the vehicle 102 reaching one of the sensing locations 204, the barrier status determinant module 152 may responsively communicate with the image sensors 134 to receive image data and/or the RADAR/LADAR sensors 136 to receive sensor wave data pertaining to the movement path of the barrier 104.

The method 400 may proceed to block 416, wherein the method 400 may include determining if the sensor data is received from the image sensors 134 and the RADAR/LADAR sensors 136. In one embodiment, the barrier status determinant module 152 may determine that sensor data is received from both of the image sensors 134 and the RADAR/LADAR sensors 136 based on the receipt of image data and sensor wave data respectively from the image sensors 134 and the RADAR/LADAR sensors 136. Alternatively, if the barrier status determinant module 152 only receives image data or only receives sensor wave data, upon the vehicle 102 reaching one of the sensing locations, the barrier status determinant module 152 may determine that the sensor data is not received from both sensors 134, 136.

If it is determined that sensor data is received from the image sensors 134 and the RADAR/LADAR sensors 136 (at block 416), the method 400 may proceed to block 418, wherein the method 400 may include aggregating sensor data received from the image sensors 134 and the RADAR/LADAR sensors 136. In an exemplary embodiment, upon the receipt of the image data from the image sensors 134 and the sensor data from the RADAR/LADAR sensors 136, the barrier status determinant module 152 may utilize a sensor data fusion logic to aggregate the image data and the sensor wave data. In other words, data pertaining to one or more images of the movement path of the barrier 104 captured by the image sensors 134 and/or the sensing of one or more possible obstacles located within the movement path of the barrier 104 may be combined in order to be analyzed as an aggregated sensor data package.

The method 400 may proceed to block 420, wherein the method 400 may include analyzing the sensor data to determine if at least one individual or at least one object is located within the movement path of the barrier 104. In one embodiment, upon receiving image data from the image sensors 134, the sensor wave data from the RADAR/LADAR sensors 136, or upon aggregating the image data and the sensor wave data into the aggregated sensor data package, the barrier status determinant module 152 may utilize logic to process the image data, sensor wave data, and/or the aggregated data package. In one or more embodiments, the logic may include processing techniques such as feature extraction, RADAR/LADAR wave data evaluation, pattern recognition, density analysis, refraction analysis, reflection analysis, target analysis, and/or additional sensing analysis techniques that may be utilized or executed as part of one or more algorithms to analyze the sensor data to determine if at least one individual and/or at least one object is located within the movement path of the barrier 104.

In one or more embodiments, the logic may take into account the barrier attributes that are retrieved from the barrier profile that may include, but are not limited to, the moving direction of the barrier 104 and data pertaining to driveways/roads leading up to the barrier 104 to more accurately determine if at least one individual and/or at least one object is located within the movement path of the barrier 104. In particular, the direction of the barrier 104 as it's opened and the slope of a surface leading up to the barrier 104 may be accounted for when determining if the individual(s) and/or object(s) are located within the movement path.

In an additional embodiment, the barrier status determinant module 152 may utilize the TCU 120 to communicate with the external server infrastructure 144 through the internet cloud 126 to access and analyze barrier image data provided by the barrier controller 108 in addition to the aforementioned sensor data to determine if at least one individual or at least one object is located within the movement path of the barrier 104. As discussed above, in one embodiment, the plurality of cameras of the barrier image sensors 146 may be disposed above/adjacent to the barrier 104 or within the area enclosed by the barrier 104 to capture images/video of the moving path of the barrier 104 and respective barrier image data may be stored on the external server infrastructure 144 to be accessed and evaluated by the barrier movement control application 106.

The method 400 may proceed to block 422, wherein the method 400 may include determining at least one individual and/or at least one object located within the movement path of the barrier 104. In an exemplary embodiment, upon utilizing the logic to analyze the image data, sensor wave data, the barrier image data and/or the aggregated data package, the barrier status determinant module 152 may determine if at least one individual and/or at least one object is located within the movement path of the barrier 104. In other words, based on the analysis of the image data, sensor wave data, and/or the aggregated data, the barrier status determinant module 152 may determine if one or more individuals and/or one or more objects is located within the movement path of the barrier 104 that may obstruct the automatic opening of the barrier 104 as the vehicle 102 arrives towards the barrier 104.

If it is determined that at least one individual and/or at least one object is located within the movement path of the barrier 104 (at block 422), the method 400 may proceed to block 424, wherein the method 400 may include inhibiting sending at least one barrier control signal to the barrier controller 108 to traverse the barrier 104 to the opened state. In an exemplary embodiment, upon determining that at least one individual and/or at least one object is located within the movement path of the barrier 104, the barrier status determinant module 152 may communicate respective data to the barrier control module 154. Upon receiving the respective data indicating the presence of at least one individual and/or at least one object within the movement path of the barrier 104, the barrier control module 154 may ensure that data is sent to the vehicle communication system 128 to thereby inhibit the sending of the barrier control signal(s) to the barrier controller 108 associated with the barrier 104. Consequently, the barrier status determinant module 152 inhibits the automatic sending of the barrier control signal(s) that occurs when the vehicle 102 enters the barrier opening zone 206b based on the determination of the at least one individual and/or at least one object within the movement path of the barrier 104.

The method 400 may proceed to block 426, wherein the method 400 may include presenting the barrier status user interface with the barrier movement inhibition alert. In an exemplary embodiment, upon the barrier control module 154 receiving the data pertaining to the inhibition of the sending at least one barrier control signal to the barrier controller 108, the barrier control module 154 may communicate respective data to the barrier status presentation module 156. The barrier status presentation module 156 may responsively communicate with the infotainment system 118 of the vehicle 102 to present the barrier movement inhibition alert on the display unit 114. As discussed below, with respect to FIG. 6, the barrier movement inhibition alert may include a manual barrier movement user input that may be inputted by the user to allow the sending of the barrier control signal to move the barrier 104.

FIG. 4B is an illustrative example of a scenario in which the barrier control application 106 may inhibit sending of at least one barrier control signal during the arrival of the vehicle 102 towards the barrier 104 according to an exemplary embodiment. As shown, the barrier 104 which is included as an entry gate 432 may be automatically opened to allow the vehicle 102 to enter a premises upon the arrival of the vehicle 102. However, based on the analysis of sensor data to determine if at least one individual or at least one object is located within the movement path of the barrier 104 (as discussed with respect to block 420), the barrier status determinant module 152 may determine that an object 434 may be located within the movement path of the entry gate 432. Therefore, the barrier control module 154 may inhibit sending of the at least one barrier control signal to the barrier controller 108 to thereby inhibit the automatic opening of the entry gate 432.

With reference again to FIG. 4A, if it is determined that at least one individual and/or at least one object is not located within the movement path of the barrier 104 (at block 422), the method 400 may proceed to block 428, wherein the method 400 may include determining if the vehicle 102 enters the barrier opening zone 206b. Upon the vehicle 102 entering the arrival status zone 202b, the vehicle 102 may continue to travel through the arrival status zone 202b towards the barrier 104. As the vehicle 102 is traveling through the arrival status zone 202b and determines that there are no individuals and/or objects located within the movement path of the barrier 104, the location determinant module 148 may access the barrier profile stored on the storage unit 116 and may communicate with the navigation system 132 to determine if the vehicle 102 is entering any of the portions of the boundary 206a of the barrier opening zone 206b. More specifically, the location determinant module 148 may continue to compare the locational coordinates of the vehicle 102 against the plurality of GPS coordinates associated with portions of the boundary 206a to determine if they overlap with one another. If it is determined that the overlapping of the locational coordinates of the vehicle 102 occurs with the plurality of GPS coordinates associated with portions of the boundary 206a, the barrier control module 154 determines that the vehicle 102 enters the barrier opening zone 206b.

Upon determining that the vehicle 102 enters the barrier opening zone 206 (at block 428), the method 400 may proceed to block 430, wherein the method 400 may include sending at least one barrier control signal to the barrier controller 108 to traverse the barrier 104 to the opened state. In an exemplary embodiment, the barrier control module 154 may utilize the current state of the barrier 104 as the closed state or the partially opened state to accordingly send the one or more barrier control signals to remotely control the movement of the barrier 104 to traverse the barrier 104 to the opened state. More specifically, the barrier control module 154 may utilize the vehicle communication system 128 to send the one or more barrier control signals to the transceiver 140 to traverse the barrier 104 from the closed state to the opened state. Likewise, the barrier control module 154 may utilize the vehicle communication system 128 to send the one or more barrier control signals to the transceiver 140 to traverse the barrier 104 from the partially opened state to the (fully) opened state. The barrier controller 108 may evaluate the received barrier control signals and may responsively traverse the barrier 104 from the closed state or partially opened state to the opened state.

In an additional embodiment, upon inhibiting the sending of the barrier control signal(s) to automatically open the barrier 104 (at block 424), the barrier control module 154 may communicate with the barrier status determinant module 152 to determine if the at least one individual and/or at least one object has moved/been moved from the movement path of the barrier 104 before the vehicle 102 enters the barrier opening zone 206b. The barrier status determinant module 152 may utilize the image sensors 134 and/or the RADAR/LADAR sensors 136 to continually provide sensor data to be analyzed by the module 152 to determine if the at least one individual and/or at least one object continues to be located within the movement path of the barrier 104. If the barrier status determinant module 152 determines that the at least one individual and/or at least one object is no longer located within the movement path of the barrier 104, the barrier status determinant module 152 may communicate respective data to the barrier control module 154 and may consequently allow the sending of the barrier control signal(s) to the barrier controller 108 to traverse the barrier 104 to the opened state (at block 430).

In one or more embodiments, upon sending the barrier control signal(s) to the barrier controller 108 to traverse the barrier 104 to the opened state (at block 430), the barrier control module 154 may communicate respective data to the barrier status determinant module 152 to determine if the at least one individual and/or at least one object has moved/been moved within the movement path of the barrier 104 after the vehicle 102 has entered the barrier opening zone 206b and the barrier control signal(s) has been sent to the barrier controller 108. The barrier status determinant module 152 may utilize the image sensors 134 and/or the RADAR/LADAR sensors 136 to continually provide sensor data to be analyzed by the module 152 to determine if the at least one individual and/or at least one object is (subsequently) located within the movement path of the barrier 104 after the barrier control signal(s) is sent.

In one configuration, if the barrier status determinant module 152 determines that the at least one individual and/or at least one object is located within the movement path of the barrier 104 after the sending of the barrier control signal(s), the barrier status determinant module 152 may communicate respective data to the barrier control module 154 to send a subsequent barrier control signal(s) to cease movement of the barrier 104. In another configuration, if the barrier status determinant module 152 determines that the at least one individual and/or at least one object is located within the movement path of the barrier 104 after the sending of the barrier control signal(s), the barrier status determinant module 152 may communicate respective data to the barrier control module 154 to send a subsequent barrier control signal(s) to traverse the barrier 104 to the closed state.

Figure 5A:
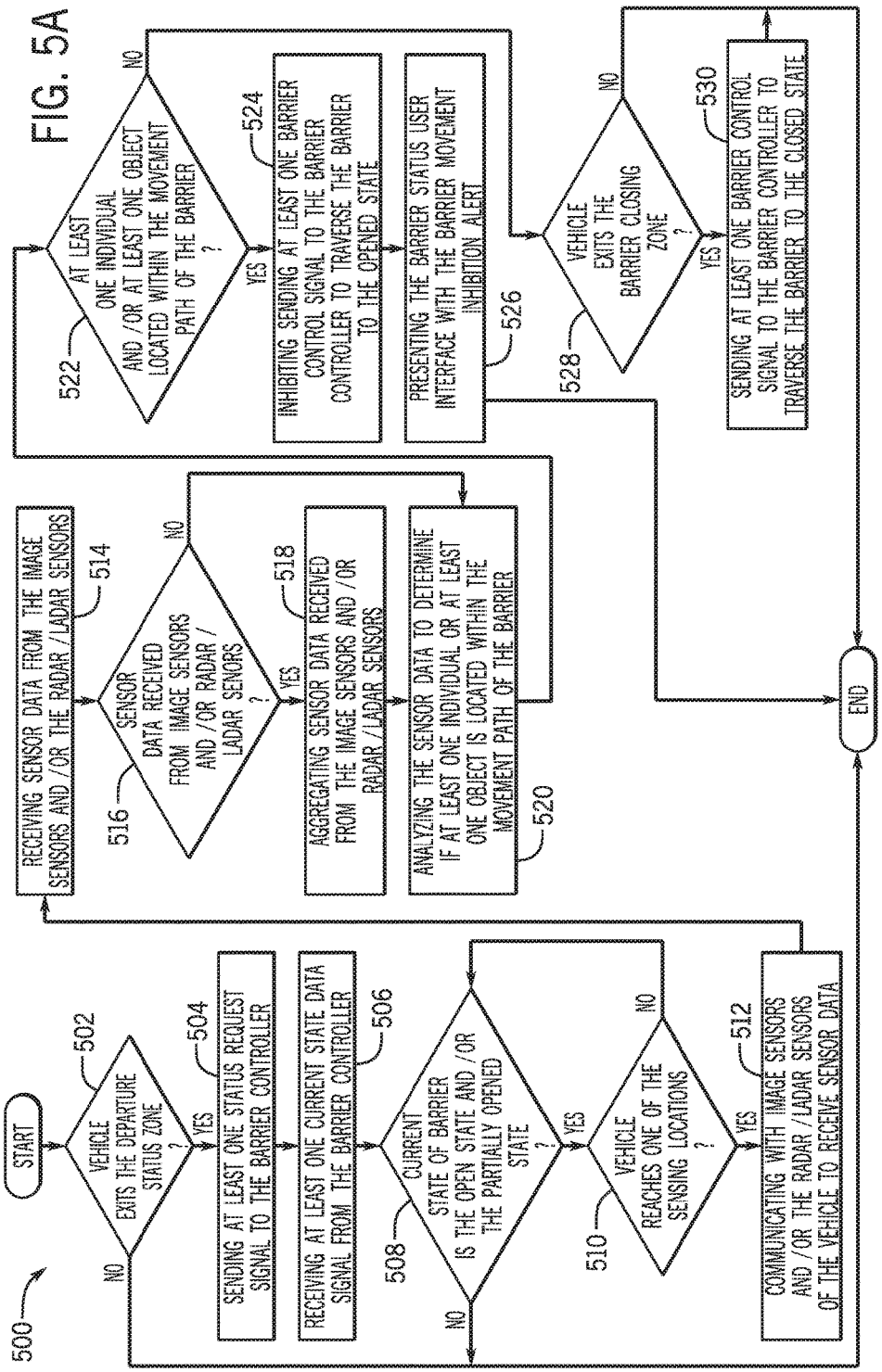
FIG. 5A is a process flow diagram of a method for inhibiting or providing automatic movement of the barrier when the vehicle is determined to be departing away from the barrier according to an exemplary embodiment.
Figure 5B:
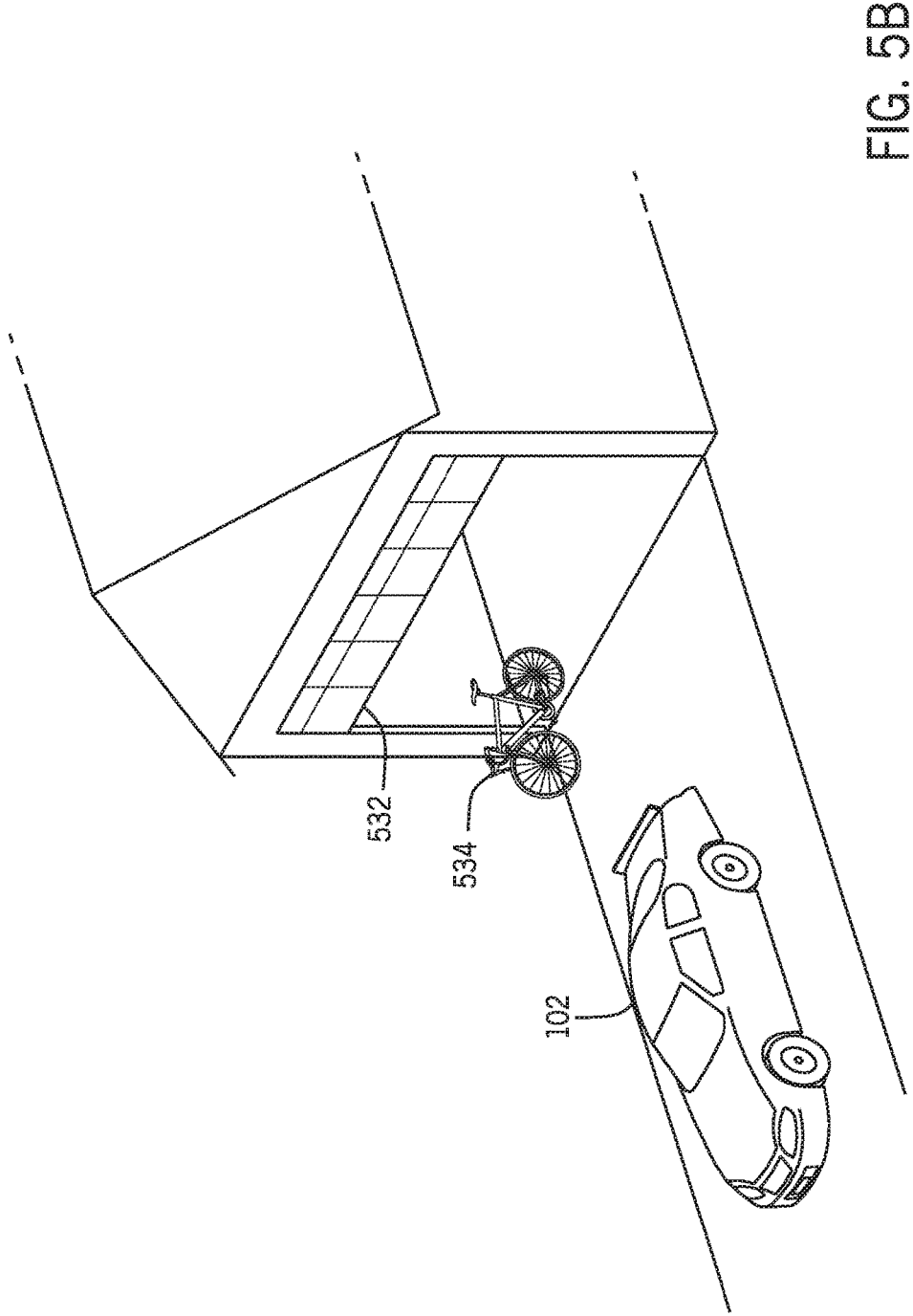
FIG. 5B is an illustrative example of a scenario in which the barrier control application may inhibit sending of at least one barrier control signal during the departure of the vehicle away from the barrier according to an exemplary embodiment.

FIG. 5A is a process flow diagram of a method 500 for inhibiting or providing automatic movement of the barrier 104 when the vehicle 102 is determined to be departing away from the barrier 104 according to an exemplary embodiment. FIG. 5A will be described with reference to the components of FIG. 1 though it is to be appreciated that the method 500 of FIG. 5A may be used with other systems and/or components. Additionally, the method 500 of FIG. 5A will be described with reference to the illustrative example of FIG. 3. As shown in FIG. 5A, the method 500 may begin at block 502, wherein the method 500 may include determining if the vehicle 102 exits the departure status zone 302b. In one embodiment, the location determinant module 148 may determine that the vehicle 102 is departing away from the barrier 104 and may communicate the location of the vehicle 102 and the traveling direction of the vehicle 102 to the zone determinant module 150. As discussed above, the zone determinant module 150 may determine the plurality of zones associated with the barrier 104 that specifically pertain to the departure of the vehicle 102 away from the barrier 104.

As discussed above, upon determining the departure status zone 302b (shown in FIG. 3), the zone determinant module 150 may populate the barrier profile associated with the barrier 104 with the plurality of GPS coordinates associated with portions the boundary 302a of the departure status zone 302b. In one embodiment, as the vehicle 102 is being driven, the location determinant module 148 may communicate with the navigation system 132 to continually determine the locational coordinates associated with the vehicle 102 as provided by the GPS 132a.

The location determinant module 148 may also access the barrier profile stored on the storage unit 116 and may communicate with the navigation system 132 to determine if the vehicle 102 is exiting any of the portions of the boundary 302a of the departure status zone 302b. More specifically, the location determinant module 148 may continually compare the locational coordinates of the vehicle 102 against the plurality of GPS coordinates associated with portions of the boundary 302a to determine if they overlap with one another. If it is determined that the overlapping of the locational coordinates of the vehicle 102 occurs with the plurality of GPS coordinates associated with portions of the boundary 302a, the location determinant module 148 may determine that the vehicle 102 exits the departure status zone 302b. For example, if the vehicle 102 is being driven away from the barrier 104 (reversing away from the barrier 104 down the driveway 310), the vehicle 102 may exit the departure status zone 302b. In such a scenario, the location determinant module 148 may determine when the vehicle 102 exits the departure status zone 302b once the vehicle 102 crosses one of the portions of the boundary 302a.

If it is determined that the vehicle 102 exits the departure status zone 302b (at block 502), the method 500 may procced to block 504, wherein the method 500 may include sending at least one status request signal to the barrier controller 108. In an exemplary embodiment, upon the location determinant module 148 determining that the vehicle 102 is crossing one of the portions of the boundary 302a to exit the departure status zone 302b (at block 502), the location determinant module 148 may communicate respective data to the barrier status determinant module 152. The barrier status determinant module 152 may responsively utilize the vehicle communication system 128 to send (e.g., transmit) one or more status request signals to the transceiver 140 to be evaluated by the barrier controller 108 to determine the current state of the barrier 104. In other words, the barrier status determinant module 152 may send the status request data signal(s) to determine if the barrier 104 is currently in the opened state, the closed state, or the partially opened state.

The method 500 may proceed to block 506, wherein the method 500 may include receiving at least one current state data signal from the barrier controller 108. As discussed above, upon determining the current state of the barrier 104, the barrier controller 108 may utilize the transceiver 140 to communicate the one or more current state data signals that include the current state of the barrier 104 as the opened state, the closed state, or the partially opened state to vehicle communication system 128.

The method 500 may proceed to block 508, wherein the method 500 may include determining if the barrier 104 is in the opened state or the partially opened state. Upon receiving the one or more current state data signals that include the current state of the barrier 104, the vehicle communication system 128 may communicate the current state of the barrier 104 to the barrier status determinant module 152. The barrier status determinant module 152 may responsively determine if the current state of the barrier 104 is in the opened state or the partially opened state. This determination may be made by the barrier status determinant module 152 to determine if the user manually actuated movement of the barrier 104 to close the barrier 104 as the vehicle 102 is departing away from the barrier 104.

If it is determined that the current state of the barrier 104 is the open state or the partially opened state at block 508, the method 500 may proceed to block 510, wherein the method 500 may include determining if the vehicle 102 reaches one or more sensing locations. As discussed above, during daily operation of the vehicle 102, when the vehicle 102 is determined to be departing away from the barrier 104, the image sensors 134, and/or the RADAR/LADAR sensors 136 may be able to make one or more sensor based determinations that may include specific areas within the vicinity of the barrier 104 at which the sensing locations 304 are determined.

With respect to the departure of the vehicle 102 away from the barrier 104, the sensing locations 304 are applied by the location determinant module 148 may be determined based on the locations at which the image sensors 134 and/or the RADAR/LADAR sensors 136 may sense the full expanse of the movement path of the barrier 104. As discussed above, the geo-locations at which the image sensors 134 are initially capable of capturing images of the full expanse of the movement path of the barrier 104 may be utilized separately or may be aggregated with the geo-locations at which the RADAR/LADAR sensors 136 are initially capable of sensing obstacles within the full expanse of the movement path of the barrier 104 as the vehicle 102 is departing away from the barrier 104.

In one embodiment, upon sending the status request signal(s), as the vehicle 102 continues to travel away from the barrier 104, the location determinant module 148 may access the barrier profile associated with the barrier 104 to retrieve the sensing locations 304 at which the image sensors 134 and/or the RADAR/LADAR sensors 136 are capable of capturing/sensing the full expanse of the movement path of the barrier 104. As the vehicle 102 continues to travel and depart away from the barrier 104, the location determinant module 148 may utilize information related to the sensing locations 304 retrieved from the barrier profile to determine that the vehicle 102 reaches one of the sensing locations 204.

In another embodiment, the location determinant module 148 may determine that the vehicle 102 reaches one of the sensing locations 304 based on the receipt of one or more sensing signals sent by the image sensors 134 that indicate that the sensors 134 are able to and/or are capturing images of the full expanse of the movement path of the barrier 104 as the vehicle 102 is departing away from the barrier 104. Additionally, or alternatively, the location determinant module 148 may determine that the vehicle 102 reaches one of the sensing locations 204 based on the receipt of one or more sensing signal sent by the RADAR/LADAR sensors 136 that the sensors 136 are capable of and/or are sensing obstacles that may be located within the full expanse of movement path of the barrier 104.

If it is determined that the vehicle 102 reaches one or more of the sensing locations 304 (at block 510), the method 500 may proceed to block 512, wherein the method 500 may include communicating with the image sensors 134 and/or the RADAR/LADAR sensors 136 of the vehicle 102 to receive sensor data. In an exemplary embodiment, upon determining that the vehicle 102 has reached one of the sensing locations 304, the location determinant module 148 may communicate respective data to the barrier status determinant module 152.

The method 500 may proceed to block 514, wherein the method 400 may include receiving sensor data from the image sensors 134 and/or the RADAR/LADAR sensors 136. In one or more embodiments, upon receiving data from the location determinant module 148 pertaining to the vehicle 102 reaching one of the sensing locations 304, the barrier status determinant module 152 may responsively communicate with the image sensors 134 to receive image data and/or the RADAR/LADAR sensors 136 to receive sensor wave data pertaining to the movement path of the barrier 104.

The method 500 may proceed to block 516, wherein the method 500 may include determining if the sensor data is received from the image sensors 134 and the RADAR/LADAR sensors 136. In one embodiment, the barrier status determinant module 152 may determine that sensor data is received from both of the image sensors 134 and the RADAR/LADAR sensors 136 based on the receipt of image data and sensor wave data respectively from the image sensors 134 and the RADAR/LADAR sensors 136. Alternatively, if the barrier status determinant module 152 only receives image data or only receives sensor wave data upon the vehicle 102 reaching one of the sensing locations, the barrier status determinant module 152 may determine that the sensor data is not received from both sensors 134, 136.

If it is determined that sensor data is received from the image sensors 134 and the RADAR/LADAR sensors 136 (at block 516), the method 500 may proceed to block 518, wherein the method 500 may include aggregating sensor data received from the image sensors 134 and the RADAR/LADAR sensors 136. As discussed above, the barrier status determinant module 152 may utilize sensor data fusion logic to aggregate the image data and the sensor wave data. In other words, data pertaining to one or more images of the movement path of the barrier 104 captured by the image sensors 134 and/or the sensing of one or more possible obstacles located within the movement path of the barrier 104 may be combined in order to be analyzed as an aggregated sensor data package.

The method 500 may proceed to block 520, wherein the method 500 may include analyzing the sensor data to determine if at least one individual or at least one object is located within the movement path of the barrier 104. In one embodiment, upon receiving image data from the image sensors 134, the sensor wave data from the RADAR/LADAR sensors 136, or upon aggregating the image data and the sensor wave data into the aggregated sensor data package, the barrier status determinant module 152 may utilize logic (discussed above with respect to block 518 of FIG. 5) to process the image data, sensor wave data, and/or the aggregated data package.

In one or more embodiments, the logic may take into account the barrier attributes retrieved from the barrier profile, discussed above, that may include, but are not limited to the moving direction of the barrier 104 and data pertaining to driveways/roads leading up to the barrier 104 to more accurately determine if at least one individual and/or at least one object is located within the movement path of the barrier 104. In particular, the direction of the barrier 104 as it's opened and the slope of a surface leading up to the barrier 104 may be accounted for when determining if the individual(s) and/or object(s) are located within the movement path. In an additional embodiment, the barrier status determinant module 152 may utilize the TCU 120 to communicate with the external server infrastructure 144 through the internet cloud 126 to access and analyze barrier image data provided by the barrier controller 108 in addition to the aforementioned sensor data to determine if at least one individual or at least one object is located within the movement path of the barrier 104.

The method 500 may proceed to block 522, wherein the method 500 may include determining at least one individual and/or at least one object located within the movement path of the barrier 104. In an exemplary embodiment, upon utilizing the logic to analyze the image data, sensor wave data, the barrier image data and/or the aggregated data package, the barrier status determinant module 152 may determine if at least one individual and/or at least one object is located within the movement path of the barrier 104. In other words, based on the analysis of the image data, sensor wave data, and/or the aggregated data, the barrier status determinant module 152 may determine if one or more individuals and/or one or more objects is located within the movement path of the barrier 104 that may obstruct the automatic closing of the barrier 104 as the vehicle 102 departs away from the barrier 104.

If it is determined that at least one individual and/or at least one object is located within the movement path of the barrier 104 (at block 522), the method 500 may proceed to block 524, wherein the method 500 may include inhibiting sending at least one barrier control signal to the barrier controller 108 to traverse the barrier 104 to the opened state. In an exemplary embodiment, upon determining that at least one individual and/or at least one object is located within the movement path of the barrier 104, the barrier status determinant module 152 may communicate respective data to the barrier control module 154. Upon receiving the respective data indicating the presence of at least one individual and/or at least one object within the movement path of the barrier 104, the barrier control module 154 may ensure that data is sent to the vehicle communication system 128 to thereby inhibit the sending of the barrier control signal(s) to the barrier controller 108 associated with the barrier 104. Consequently, the barrier status determinant module 152 inhibits the automatic sending of the barrier control signal(s) that occurs when the vehicle 102 exits the barrier closing zone 306b based on the determination of the at least one individual and/or at least one object within the movement path of the barrier 104.

The method 500 may proceed to block 526, wherein the method 500 may include presenting the barrier status user interface with the barrier movement inhibition alert. In an exemplary embodiment, upon the barrier control module 154 receiving the data pertaining to the inhibition of the sending at least one barrier control signal to the barrier controller 108, the barrier control module 154 may communicate respective data to the barrier status presentation module 156. The barrier status presentation module 156 may responsively communicate with the infotainment system 118 of the vehicle 102 to present the barrier movement inhibition alert on the display unit 114. As discussed below, with respect to FIG. 6, the barrier movement inhibition alert may include a manual barrier movement user input that may be inputted by the user to allow the sending of the barrier control signal to move the barrier 104.

FIG. 5B is an illustrative example of a scenario in which the barrier control application 106 may inhibit sending of at least one barrier control signal during the departure of the vehicle 102 away from the barrier 104 according to an exemplary embodiment. As shown, the barrier 104 which is included as a garage door 532 may be automatically closed from the fully opened state when the vehicle 102 departs away from the barrier 104. However, based on the analysis of sensor data to determine if at least one individual or at least one object is located within the movement path of the barrier 104 (as discussed with respect to block 520), the barrier status determinant module 152 may determine that an object 534 may be located within the movement path of the barrier 104. Therefore, the barrier control module 154 may inhibit sending the at least one barrier control signal to the barrier controller 108 to thereby inhibit the automatic closing of the garage door 532.

With reference again to FIG. 5A, if it is determined that at least one individual and/or at least one object is not located within the movement path of the barrier 104 (at block 522), the method 500 may proceed to block 528, wherein the method 500 includes determining if the vehicle 102 exits the barrier closing zone 306b. In one embodiment, upon the vehicle 102 exiting the departure status zone 302b, the vehicle 102 may continue to travel through the barrier closing zone 306b as the vehicle 102 continues to depart away from the barrier 104. As the vehicle 102 is traveling through the barrier closing zone 306b, the location determinant module 148 may access the barrier profile stored on the storage unit 116 and may communicate with the navigation system 132 to determine if the vehicle 102 is exiting (e.g., crossing) any of the portions of the boundary 306a of the barrier closing zone 306b. More specifically, the location determinant module 148 may continue to compare the locational coordinates of the vehicle 102 against the plurality of GPS coordinates associated with portions of the boundary 306a to determine if they overlap with one another. If it is determined that the overlapping of the locational coordinates of the vehicle 102 occurs with the plurality of GPS coordinates associated with portions of the boundary 306a, the barrier control module 154 determines that the vehicle 102 exits the barrier closing zone 306b.

Upon determining that the vehicle 102 exists the barrier closing zone 306b (at block 528), the method 500 may proceed to block 530, wherein the method 500 may include sending at least one barrier control signal to the barrier controller 108 to traverse the barrier 104 to the closed state. In an exemplary embodiment, the barrier control module 154 may utilize the current state of the barrier 104 as the opened state or the partially opened state to accordingly send the one or more barrier control signals to remotely control the movement of the barrier 104 to traverse the barrier 104 to the closed state. More specifically, the barrier control module 154 may utilize the vehicle communication system 128 to send the one or more barrier control signals to the transceiver 140 to traverse the barrier 104 from the opened state to the closed state. Likewise, the barrier control module 154 may utilize the vehicle communication system 128 to send the one or more barrier control signals to the transceiver 140 to traverse the barrier 104 from the partially opened state to the (fully) closed state. The barrier controller 108 may evaluate the received barrier control signals and may responsively traverse the barrier 104 from the opened state or partially opened state to the closed state.

In an additional embodiment, upon inhibiting the sending of the barrier control signal(s) to automatically open the barrier 104 (at block 524), the barrier control module 154 may communicate with the barrier status determinant module 152 to determine if the at least one individual and/or at least one object has moved/been moved from the movement path of the barrier 104 before the vehicle 102 exits the barrier closing zone 306b. The barrier status determinant module 152 may utilize the image sensors 134 and/or the RADAR/LADAR sensors 136 to continually provide sensor data to be analyzed by the module 152 to determine if the at least one individual and/or at least one object continues to be located within the movement path of the barrier 104. If the barrier status determinant module 152 determines that the at least one individual and/or at least one object is no longer located within the movement path of the barrier 104, the barrier status determinant module 152 may communicate respective data to the barrier control module 154 and may consequently allow the sending of the barrier control signal(s) to the barrier controller 108 to traverse the barrier 104 to the closed state (at block 530).

In one or more embodiments, upon sending the barrier control signal(s) to the barrier controller 108 to traverse the barrier 104 to the closed state (at block 530), the barrier control module 154 may communicate respective data to the barrier status determinant module 152 to determine if the at least one individual and/or at least one object has moved/been moved within the movement path of the barrier 104 after the vehicle 102 has exited the barrier closing zone 306b and the barrier control signal(s) has been sent to the barrier controller 108. The barrier status determinant module 152 may utilize the image sensors 134 and/or the RADAR/LADAR sensors 136 to continually provide sensor data to be analyzed by the module 152 to determine if the at least one individual and/or at least one object is (subsequently) located within the movement path of the barrier 104 after the barrier control signal(s) is sent.

In one configuration, if the barrier status determinant module 152 determines that the at least one individual and/or at least one object is located within the movement path of the barrier 104 after the sending of the barrier control signal(s), the barrier status determinant module 152 may communicate respective data to the barrier control module 154 to send a subsequent barrier control signal(s) to cease movement of the barrier 104. In another configuration, if the barrier status determinant module 152 determines that the at least one individual and/or at least one object is located within the movement path of the barrier 104 after the sending of the barrier control signal(s), the barrier status determinant module 152 may communicate respective data to the barrier control module 154 to send a subsequent barrier control signal(s) to traverse the barrier 104 to the opened state.

Figure 6:
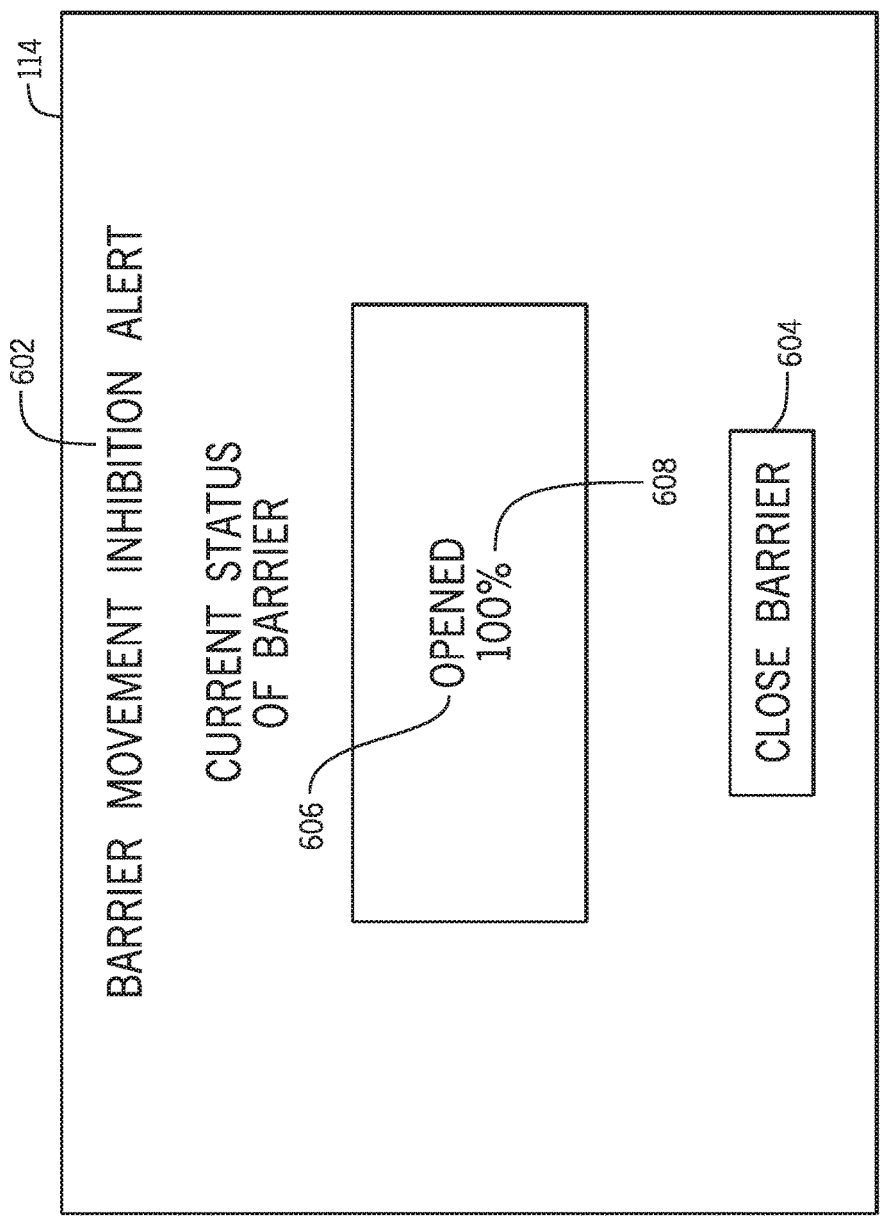
FIG. 6 is an illustrative example of the barrier movement inhibition alert presented on the display unit of the vehicle according to an exemplary embodiment.

FIG. 6 is an illustrative example of the barrier movement inhibition alert 602 presented on the display unit 114 of the vehicle 102 according to an exemplary embodiment. As discussed, the barrier movement inhibition alert 602 may be presented when the barrier control application 106 inhibits the sending of at least one barrier control signal to the barrier control to traverse the barrier 104 to the opened state or the closed state. As shown, the barrier movement inhibition alert 602 may include a manual barrier movement user input 604 that may be inputted by the user to manually override inhibiting of the sending of the at least one barrier control signal. In other words, upon the inhibiting of the automatic movement of the barrier 104 by the application 106, the user may input the manual barrier movement user input 604 to manually actuate the opening and/or closing of the barrier 104.

In one embodiment, the barrier movement inhibition alert 602 may additionally include the current status of the barrier 606 as determined based on the vehicle 102 entering the arrival status zone 202b or the vehicle 102 exiting the departure status zone 302b. Additionally, the barrier movement inhibition alert 602 may include the barrier traversing level 608 that indicates the opening/closing level of the barrier 104.

Figure 7:
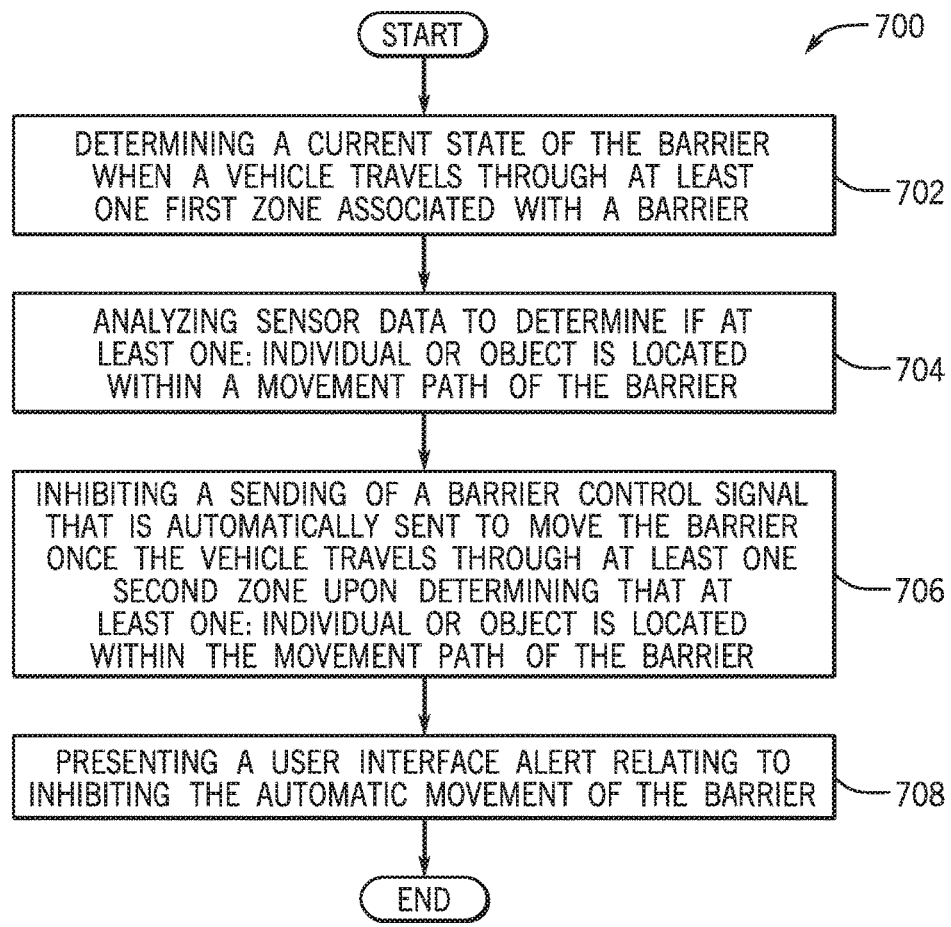
FIG. 7 is a process flow diagram of a method for inhibiting automatic movement of the barrier according to an exemplary embodiment.

FIG. 7 is a process flow diagram of a method 700 for inhibiting automatic movement of the barrier 104 according to an exemplary embodiment. FIG. 7 will be described with reference to the components of FIG. 1 though it is to be appreciated that the method of FIG. 7 may be used with other systems and/or components. The method 700 may begin at block 702, wherein the method 700 may include determining a current state of the barrier 104 when a vehicle 102 travels through at least one first zone associated with a barrier 104. The method 700 may proceed to block 704, wherein the method 700 may include analyzing sensor data to determine if at least one: individual or object is located within a movement path of the barrier 104. As discussed above, at least one barrier control signal is sent to automatically control movement to open or close the barrier based on the current state of the barrier.

The method 700 may proceed to block 706, wherein the method 700 may include inhibiting a sending of a barrier control signal that is automatically sent to move the barrier 104 once the vehicle 102 travels through at least one second zone upon determining that at least one: individual or object is located within the movement path of the barrier 104. The method 700 may proceed to block 708, wherein the method 700 may include presenting a user interface alert relating to inhibiting the automatic movement of the barrier 104. The user interface alert includes a manual barrier movement user input that may be inputted to send the at least one barrier control signal to move the barrier.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for inhibiting automatic movement of a barrier, comprising: determining a current state of the barrier when a vehicle travels through at least one first zone associated with the barrier; analyzing sensor data to determine if at least one individual or object is located within a movement path of the barrier, wherein at least one barrier control signal is sent to automatically control movement to open or close the barrier based on the current state of the barrier; inhibiting a sending of the at least one barrier control signal from the vehicle to a barrier controller associated with the barrier that is automatically sent to move the barrier once the vehicle travels through at least one second zone upon determining that the at least one individual or object is located within the movement path of the barrier; and presenting a user interface alert relating to inhibiting the automatic movement of the barrier upon inhibiting the sending of the at least one barrier control signal from the vehicle.

2. The computer-implemented method of claim 1, wherein determining the current state of the barrier includes determining that the barrier is at least one of: an opened state, a partially opened state, and a closed state.

3. The computer-implemented method of claim 1, wherein analyzing sensor data includes receiving sensor data from at least one of: image sensors and RADAR/LADAR sensors when the vehicle reaches at least one sensing location that pertains to at least one of: the arrival of the vehicle towards the barrier and the departure of the vehicle away from the barrier.

4. The computer-implemented method of claim 3, wherein the at least one sensing location is determined based on a capability of at least one of: the image sensors to capture images of a full expanse of the movement path of barrier and the RADAR/LADAR sensors to sense obstacles that may be located within the full expanse of the movement path of the barrier.

5. The computer-implemented method of claim 3, wherein image data is received from the image sensors and sensor wave data is received from the RADAR/LADAR sensors, wherein the image data and the sensor wave data is aggregated into a sensor data package, wherein the sensor data package is analyzed to determine if the at least one: individual or object is located within the movement path of the barrier.

6. The computer-implemented method of claim 5, wherein the at least one barrier control signal is sent to the barrier controller associated with the barrier to traverse the barrier to an opened state upon determining that the at least one: individual or object is not located within the movement path of the barrier when the vehicle is arriving towards the barrier and when the current state of the barrier is determined to be a closed state or a partially opened state.

7. The computer-implemented method of claim 6, wherein the at least one barrier control signal is sent to the barrier controller associated with the barrier to traverse the barrier to the closed state upon determining that the at least one: individual or object is not located within the movement path of the barrier when the vehicle is departing away from the barrier and the current state of the barrier is determined to be the opened state or the partially opened state.

8. The computer-implemented method of claim 6, wherein inhibiting the sending of the at least one barrier control signal includes communicating data that indicates the determination that the at least one: individual or object is located within the movement path of the barrier to a vehicle communication system to inhibit the sending of the at least one barrier control signal from the vehicle to the barrier controller associated with the barrier.

9. The computer-implemented method of claim 1, wherein presenting the user interface alert relating to inhibiting the automatic movement of the barrier includes presenting a manual barrier movement user input that may be inputted to send the at least one barrier control signal to move the barrier.

10. A system for inhibiting automatic movement of a barrier, comprising: a memory storing instructions when executed by a processor cause the processor to: determine a current state of the barrier when a vehicle travels through at least one first zone associated with the barrier; analyze sensor data to determine if at least one individual or object is located within a movement path of the barrier, wherein at least one barrier control signal is sent to automatically control movement to open or close the barrier based on the current state of the barrier; inhibit a sending of the at least one barrier control signal from the vehicle to a barrier controller associated with the barrier that is automatically sent to move the barrier once the vehicle travels through at least one second zone upon determining that the at least one individual or object is located within the movement path of the barrier; and present a user interface alert relating to inhibiting the automatic movement of the barrier upon inhibiting the sending of the at least one barrier control signal from the vehicle.

11. The system of claim 10, wherein determining the current state of the barrier includes determining that the barrier is at least one of: an opened state, a partially opened state, and a closed state.

12. The system of claim 10, wherein analyzing sensor data includes receiving sensor data from at least one of: image sensors and RADAR/LADAR sensors when the vehicle reaches at least one sensing location that pertains to at least one of: the arrival of the vehicle towards the barrier and the departure of the vehicle away from the barrier.

13. The system of claim 12, wherein the at least one sensing location is determined based on a capability of at least one of: the image sensors to capture images of a full expanse of the movement path of barrier and the RADAR/LADAR sensors to sense obstacles that may be located within the full expanse of the movement path of the barrier.

14. The system of claim 12, wherein image data is received from the image sensors and sensor wave data is received from the RADAR/LADAR sensors, wherein the image data and the sensor wave data is aggregated into a sensor data package, wherein the sensor data package is analyzed to determine if the at least one: individual or object is located within the movement path of the barrier.

15. The system of claim 14, wherein the at least one barrier control signal is sent to the barrier controller associated with the barrier to traverse the barrier to an opened state upon determining that the at least one: individual or object is not located within the movement path of the barrier when the vehicle is arriving towards the barrier and when the current state of the barrier is determined to be a closed state or a partially opened state.

16. The system of claim 15, wherein the at least one barrier control signal is sent to the barrier controller associated with the barrier to traverse the barrier to the closed state upon determining that the at least one: individual or object is not located within the movement path of the barrier when the vehicle is departing away from the barrier and the current state of the barrier is determined to be the opened state or the partially opened state.

17. The system of claim 15, wherein inhibiting the sending of the at least one barrier control signal includes communicating data that indicates the determination that the at least one: individual or object is located within the movement path of the barrier to a vehicle communication system to inhibit the sending of the at least one barrier control signal from the vehicle to the barrier controller associated with the barrier.

18. The system of claim 10, wherein presenting the user interface alert relating to inhibiting the automatic movement of the barrier includes presenting a manual barrier movement user input that may be inputted to send the at least one barrier control signal to move the barrier.

19. A non-transitory computer readable storage medium storing instructions that when executed by a computer, which includes a processor, perform a method, the method comprising: determining a current state of a barrier when a vehicle travels through at least one first zone associated with the barrier; analyzing sensor data to determine if at least one individual or object is located within a movement path of the barrier, wherein at least one barrier control signal is sent to automatically control movement to open or close the barrier based on the current state of the barrier; inhibiting a sending of the at least one barrier control signal from the vehicle to a barrier controller associated with the barrier that is automatically sent to move the barrier once the vehicle travels through at least one second zone upon determining that the at least one individual or object is located within the movement path of the barrier; and presenting a user interface alert relating to inhibiting the automatic movement of the barrier upon inhibiting the sending of the at least one barrier control signal from the vehicle.

20. The non-transitory computer readable storage medium of claim 19, wherein inhibiting the sending of the at least one barrier control signal includes communicating data that indicates the determination that the at least one: individual or object is located within the movement path of the barrier to a vehicle communication system to inhibit the sending of the at least one barrier control signal from the vehicle to the barrier controller associated with the barrier.

\* \* \* \* \*